(12) United States Patent
Gopalakrishnan et al.

(10) Patent No.: US 12,328,171 B2
(45) Date of Patent: Jun. 10, 2025

(54) BASE STATION-TO-SERVER SIGNALING OF TIME-ANGLE CHANNEL PROFILE

(71) Applicant: QUALCOMM Incorporated, San Diego, CA (US)

(72) Inventors: Sooryanarayanan Gopalakrishnan, San Diego, CA (US); Jay Kumar Sundararajan, San Diego, CA (US); Alexandros Manolakos, Escondido, CA (US); Naga Bhushan, San Diego, CA (US); Taesang Yoo, San Diego, CA (US); Krishna Kiran Mukkavilli, San Diego, CA (US); Weimin Duan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 18/042,972

(22) PCT Filed: Oct. 7, 2021

(86) PCT No.: PCT/US2021/071775
§ 371 (c)(1),
(2) Date: Feb. 24, 2023

(87) PCT Pub. No.: WO2022/082151
PCT Pub. Date: Apr. 21, 2022

(65) Prior Publication Data
US 2023/0336229 A1 Oct. 19, 2023

(30) Foreign Application Priority Data
Oct. 12, 2020 (GR) .............................. 20200100617

(51) Int. Cl.
H04B 7/06 (2006.01)
H04W 64/00 (2009.01)

(52) U.S. Cl.
CPC .......... H04B 7/0632 (2013.01); H04W 64/00 (2013.01)

(58) Field of Classification Search
CPC .... G01S 5/02; G06N 3/02; H04B 7/06; H04B 7/0408; H04B 7/0626; H04B 7/0632;
(Continued)

(56) References Cited

U.S. PATENT DOCUMENTS 11,509,363 B2 * 11/2022 Timo .................. H04B 7/0452
2019/0373595 A1 12/2019 Sadiq et al.
2023/0176174 A1 * 6/2023 Penna ................. G01S 5/02521
342/451

FOREIGN PATENT DOCUMENTS

WO 2020180221 A1 9/2020

OTHER PUBLICATIONS

Intel Corporation: "Analysis of Techniques for NR DL Positioning", 3GPP Draft, R1-1900512, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, Jan. 12, 2019 (Jan. 12, 2019), pp. 1-25, XP051576118, pp. 1, 2, 3, 5 pp. 11, 13 chapter 8, p. 20 figures 1, 2, 3 Chapter 6.1.3, p. 16.
(Continued)

Primary Examiner — Shawkat M Ali
(74) Attorney, Agent, or Firm — Thien T. Nguyen

(57) ABSTRACT

Disclosed are techniques for wireless positioning. In an aspect, a base station determines a channel profile for a multipath channel between the base station and a user equipment (UE) based on at least one positioning reference signal transmitted to the UE or received from the UE by the
(Continued)

base station on one or more radio beams, compresses the channel profile into a compressed representation of the channel profile, and transmits the compressed representation of the channel profile to a network entity. The network entity receives the compressed representation of the time-angle channel profile and determines a location of the UE based on the compressed representation of the channel profile.

40 Claims, 13 Drawing Sheets

(58) Field of Classification Search
CPC ...... H04B 7/0658; H04W 4/02; H04W 4/029; H04W 24/10; H04W 36/00; H04W 56/00; H04W 64/00; H04W 72/04; H04W 72/08
USPC ................ 375/219, 260, 267, 295, 299, 316
See application file for complete search history.

(56) References Cited

OTHER PUBLICATIONS

Intel Corporation: "Analysis of Techniques for NR UL Positioning", 3GPP Draft, R1-1900513, 3GPP TSG RAN WG1 Ad-Hoc Meeting 1901, Intel—NR_UL_POS, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 12, 2019, XP051576119, pp. 1-15.
International Search Report and Written Opinion—PCT/US2021/071775—ISA/EPO—Feb. 9, 2022.

\* cited by examiner

BASE STATION-TO-SERVER SIGNALING OF TIME-ANGLE CHANNEL PROFILE

CROSS-REFERENCE TO RELATED APPLICATIONS

The present Application for Patent claims priority to Greek patent application No. 20200100617, entitled "BASE STATION-TO-SERVER SIGNALING OF TIME-ANGLE CHANNEL PROFILE," filed Oct. 12, 2020, which is assigned to the assignee hereof and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a base station includes determining a channel profile for a multipath channel between the base station and a user equipment (UE) based on at least one positioning reference signal transmitted to the UE or received from the UE by the base station on one or more radio beams; compressing the channel profile into a compressed representation of the channel profile; and transmitting the compressed representation of the channel profile to a network entity to enable the network entity to determine a location of the UE.

In an aspect, a method of wireless positioning performed by a network entity includes receiving, from a base station, a compressed representation of a channel profile for a multipath channel between the base station and a user equipment (UE), the channel profile based on at least one positioning reference signal transmitted to the UE or received from the UE by the base station on one or more radio beams; and determining a location of the UE based on the compressed representation of the channel profile.

In an aspect, a base station includes a memory; at least one transceiver; and at least one processor communicatively coupled to the memory and the at least one transceiver, the at least one processor configured to: determine a channel profile for a multipath channel between the base station and a user equipment (UE) based on at least one positioning reference signal transmitted to the UE or received from the UE by the base station on one or more radio beams; compress the channel profile into a compressed representation of the channel profile; and transmit, via the at least one transceiver, the compressed representation of the channel profile to a network entity to enable the network entity to determine a location of the UE.

In an aspect, a network entity includes a memory; at least one transceiver; and at least one processor communicatively coupled to the memory and the at least one transceiver, the at least one processor configured to: receive, via the at least one transceiver, from a base station, a compressed representation of a channel profile for a multipath channel between the base station and a user equipment (UE), the channel profile based on at least one positioning reference signal transmitted to the UE or received from the UE by the base station on one or more radio beams; and determine a location of the UE based on the compressed representation of the channel profile.

In an aspect, a base station includes means for determining a channel profile for a multipath channel between the base station and a user equipment (UE) based on at least one positioning reference signal transmitted to the UE or received from the UE by the base station on one or more radio beams; means for compressing the channel profile into a compressed representation of the channel profile; and means for transmitting the compressed representation of the channel profile to a network entity to enable the network entity to determine a location of the UE.

In an aspect, a network entity includes means for receiving, from a base station, a compressed representation of a channel profile for a multipath channel between the base station and a user equipment (UE), the channel profile based on at least one positioning reference signal transmitted to the UE or received from the UE by the base station on one or more radio beams; and means for determining a location of the UE based on the compressed representation of the channel profile.

In an aspect, a non-transitory computer-readable medium stores computer-executable instructions that, when executed by a base station, cause the base station to: determine a channel profile for a multipath channel between the base station and a user equipment (UE) based on at least one positioning reference signal transmitted to the UE or received from the UE by the base station on one or more radio beams; compress the channel profile into a compressed representation of the channel profile; and transmit the compressed representation of the channel profile to a network entity to enable the network entity to determine a location of the UE.

In an aspect, a non-transitory computer-readable medium stores computer-executable instructions that, when executed by a network entity, cause the network entity to: receive, from a base station, a compressed representation of a channel profile for a multipath channel between the base station and a user equipment (UE), the channel profile based on at least one positioning reference signal transmitted to the UE or received from the UE by the base station on one or more radio beams; and determine a location of the UE based on the compressed representation of the channel profile.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
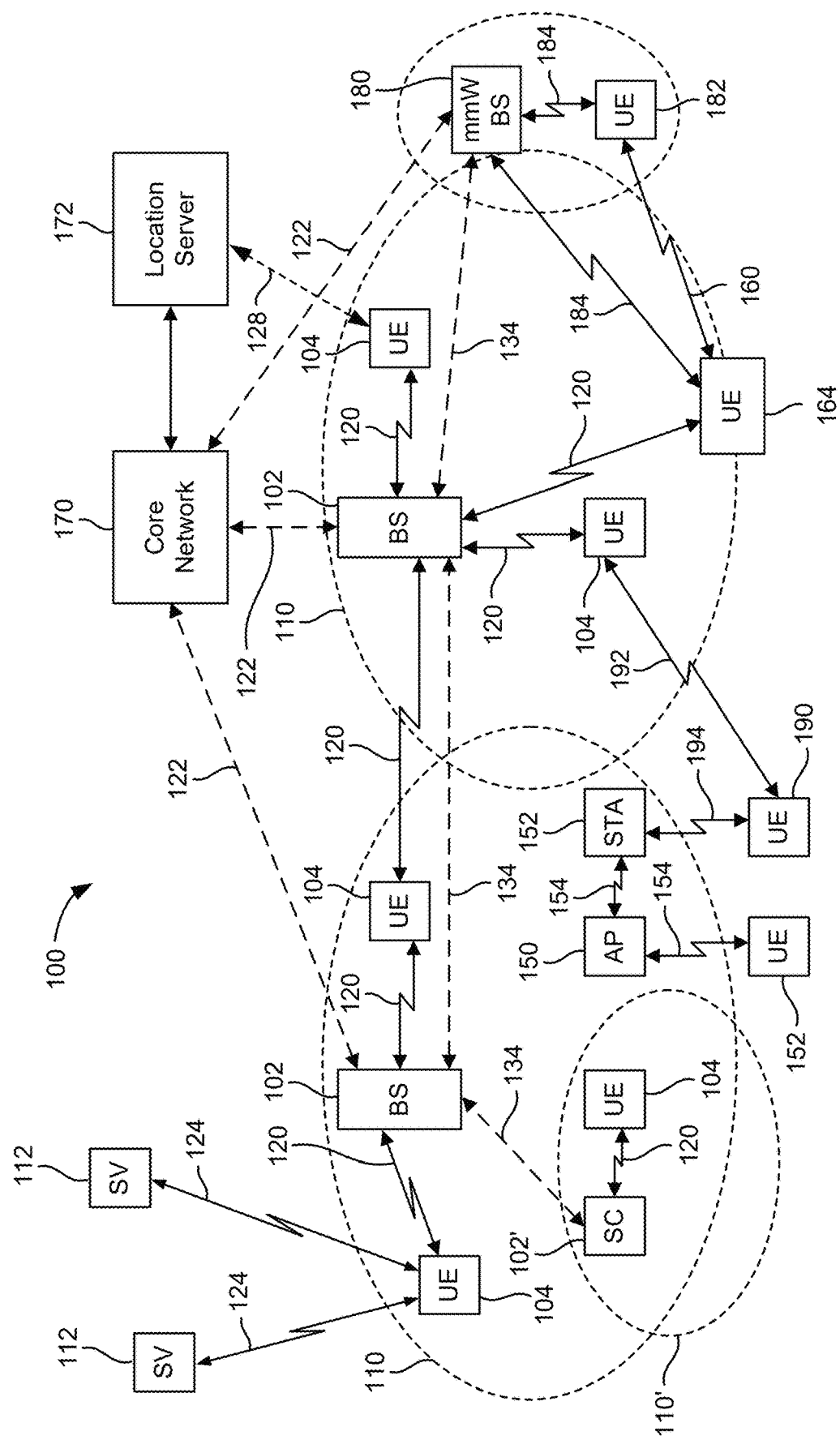
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
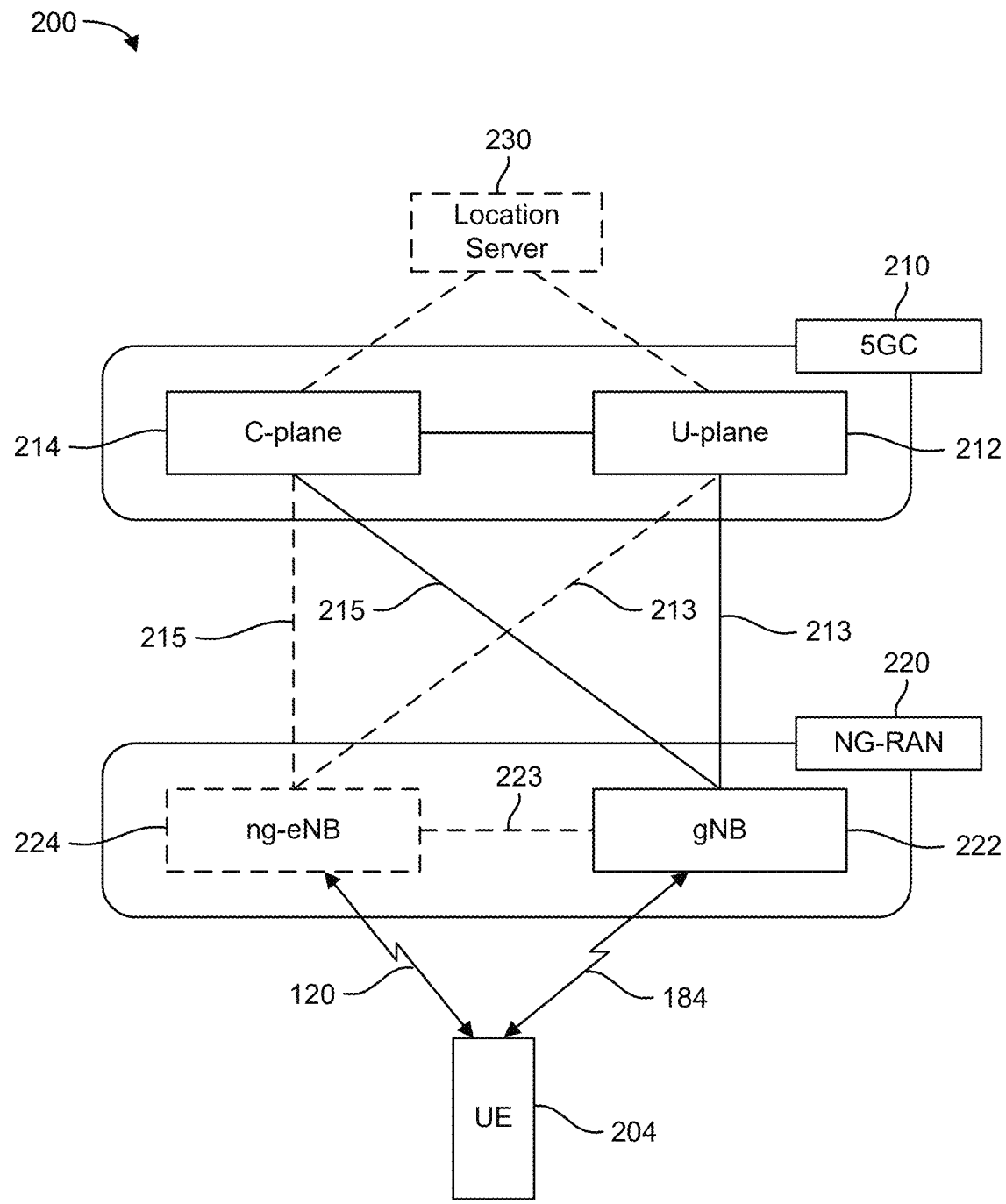
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
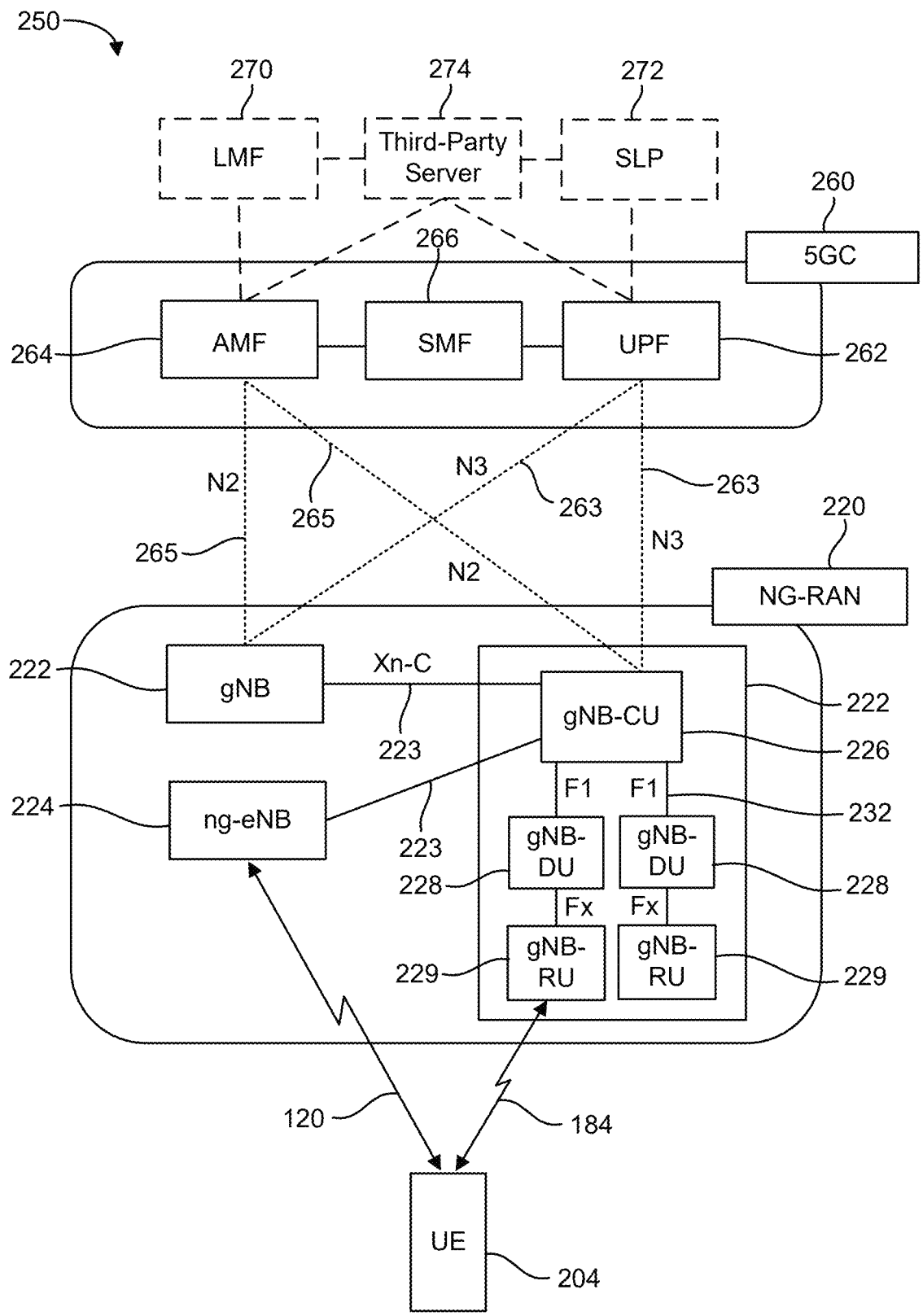

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering, lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
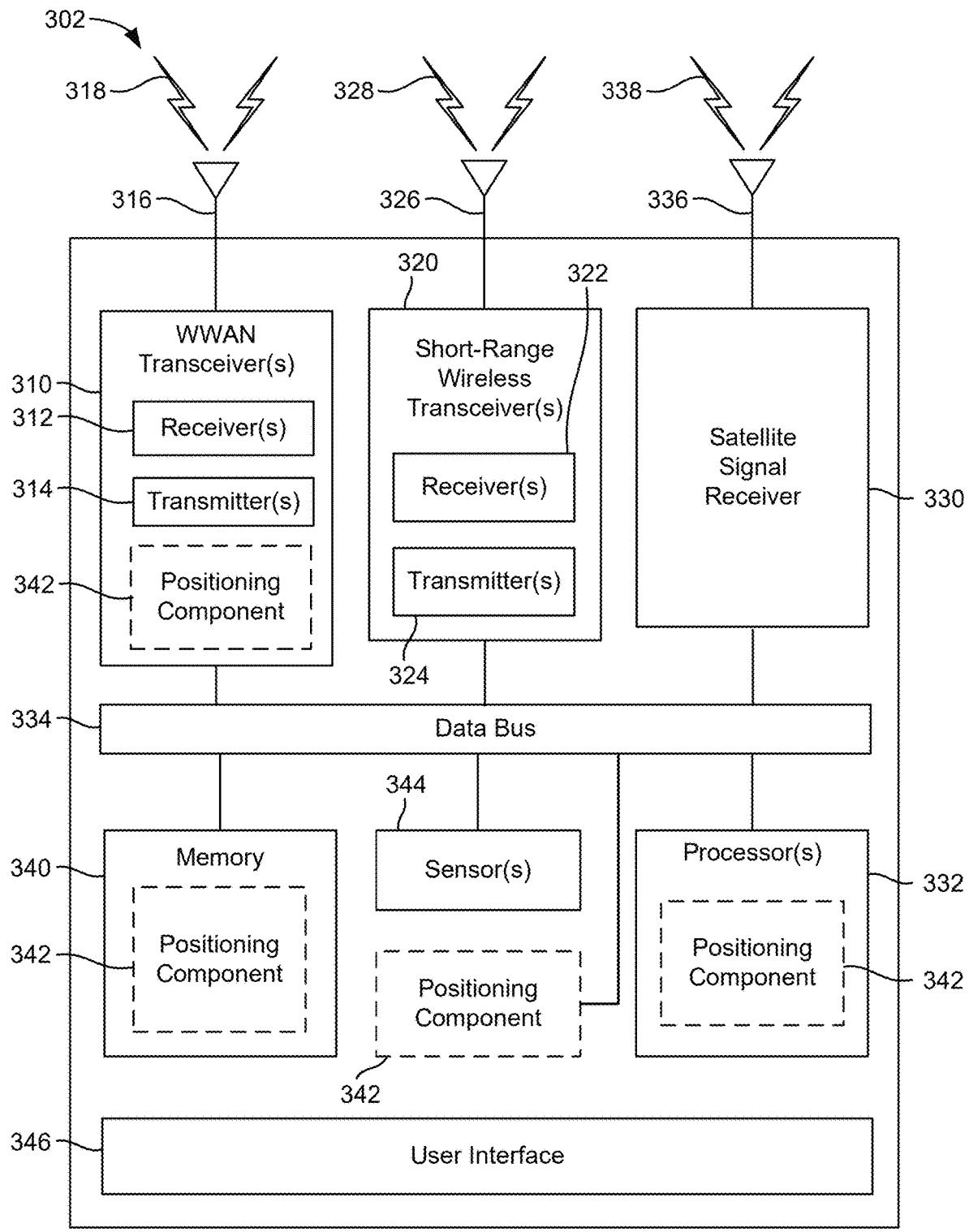
FIGS. 3A, 3B, and 3C are simplified block diagrams of several sample aspects of components that may be employed in a user equipment (UE), a base station, and a network entity, respectively, and configured to support communications as taught herein.
Figure 3B:
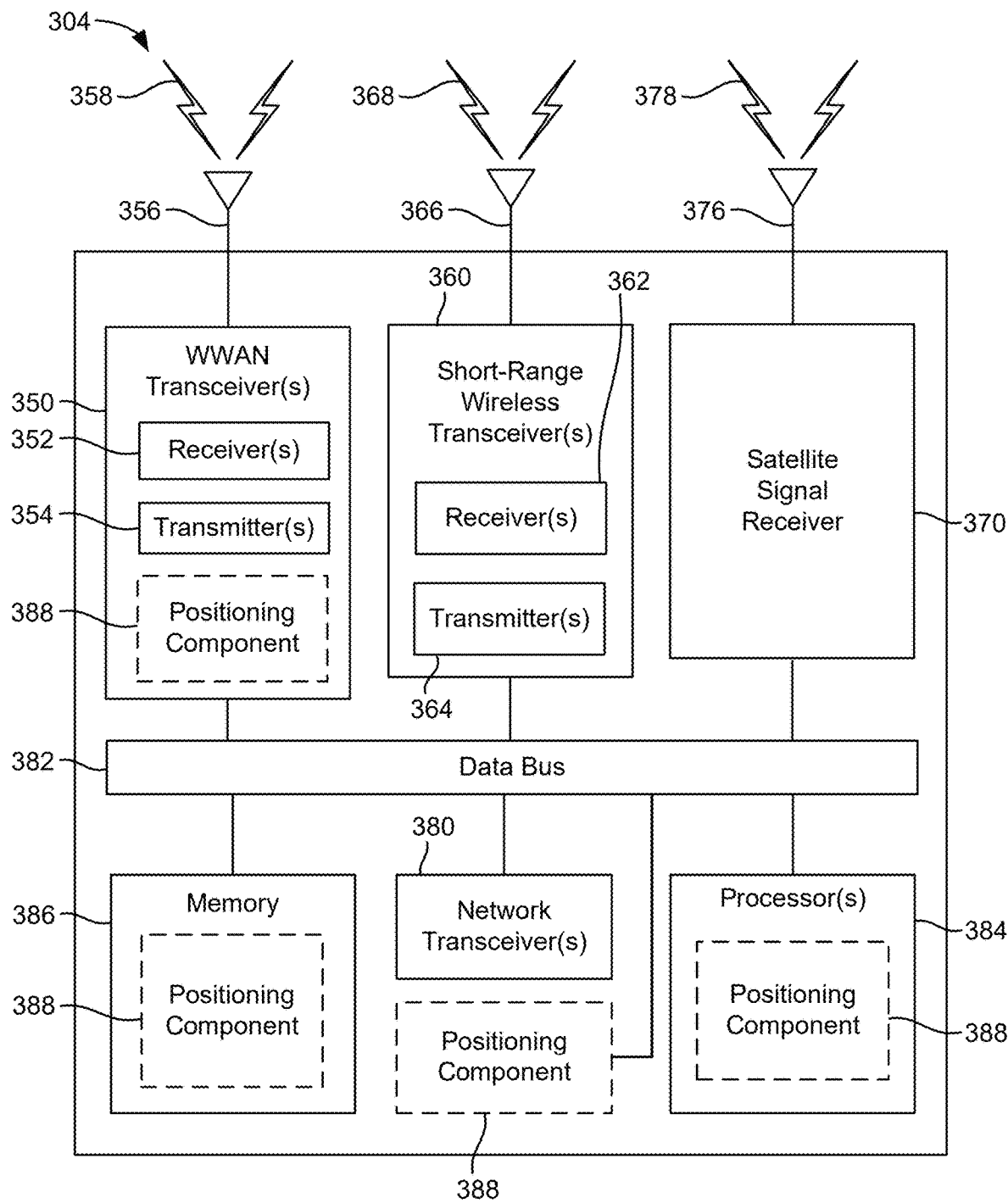
Figure 3C:
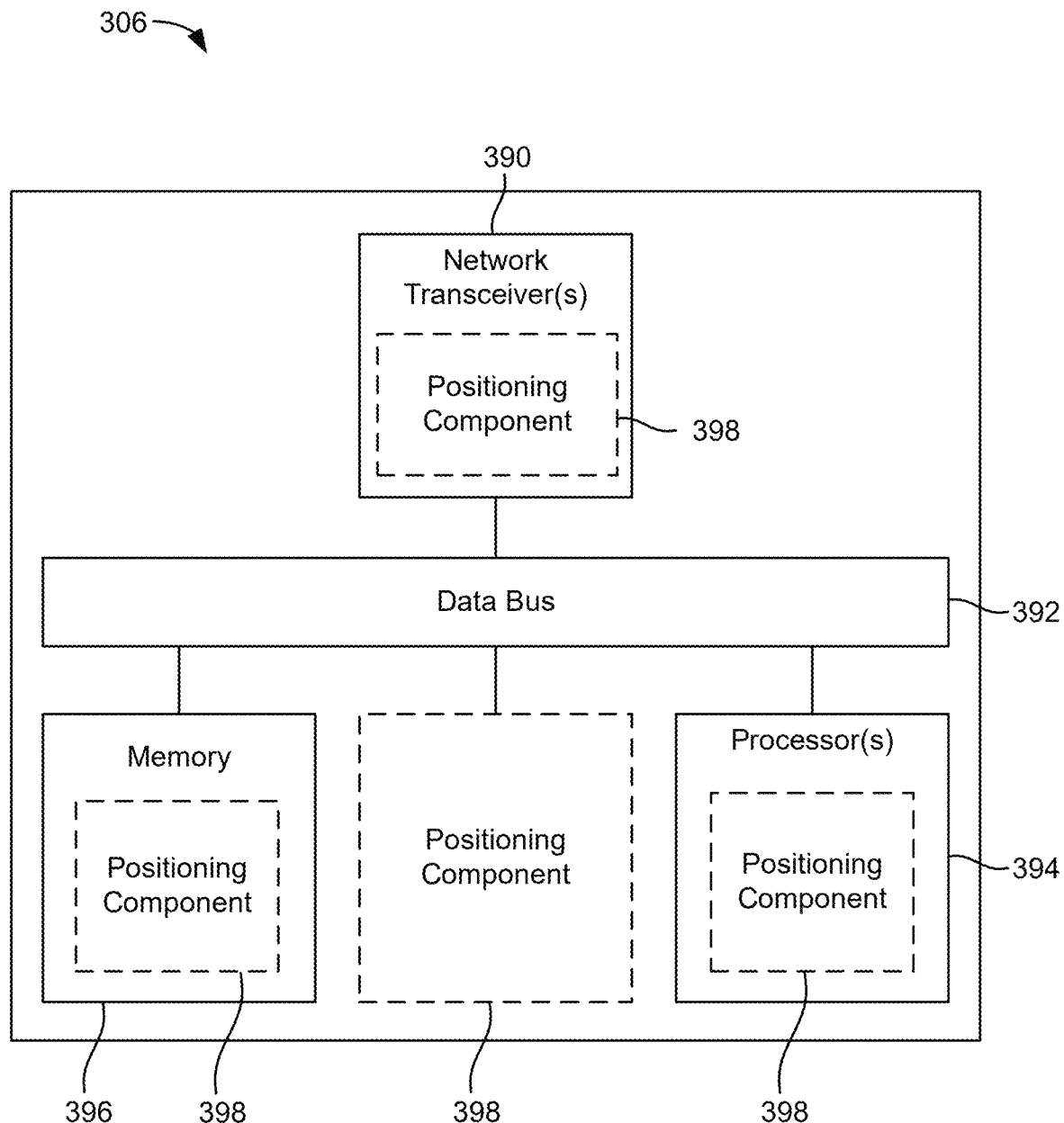

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
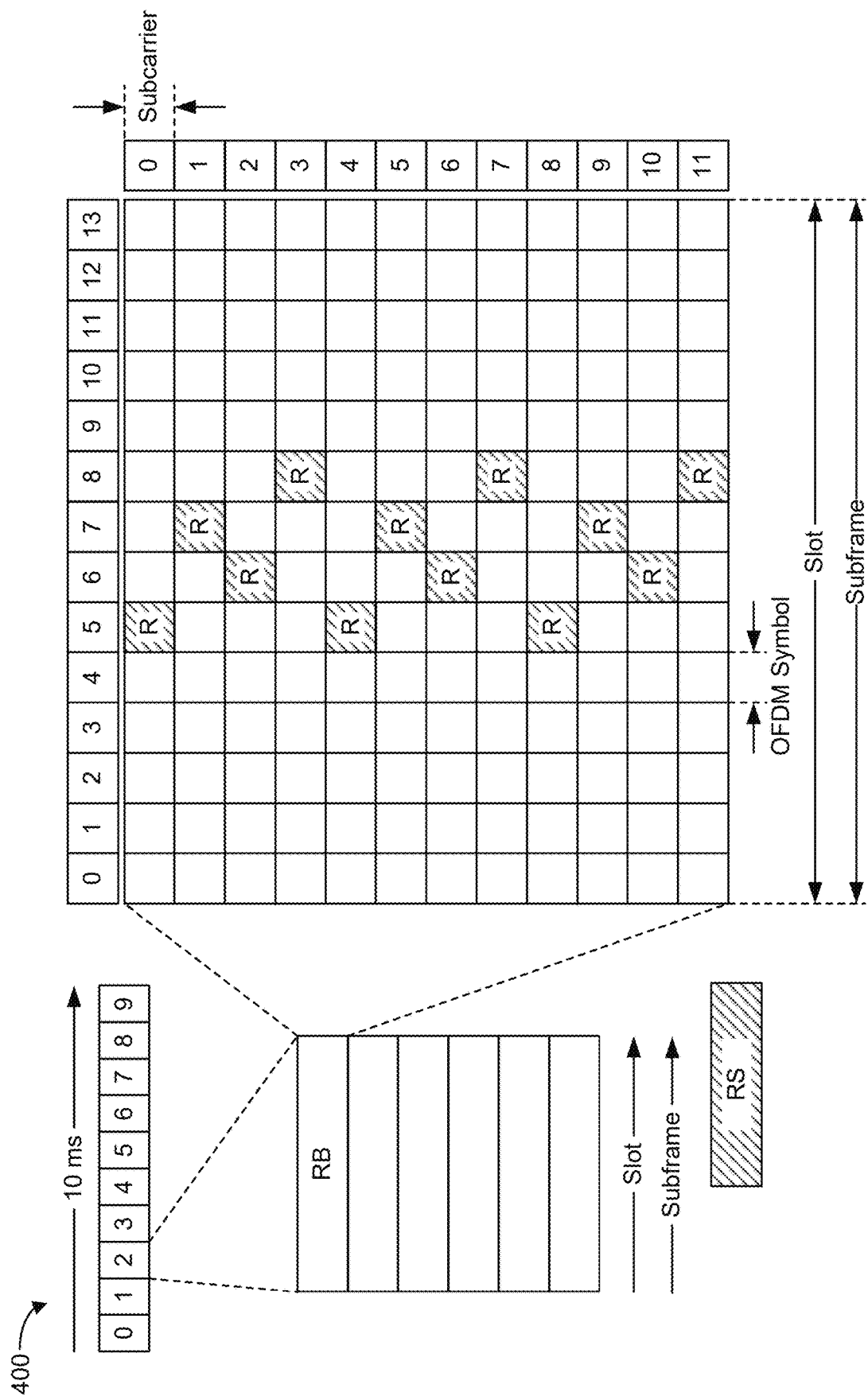
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHZ (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and N (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size N represents the subcarrier spacing (or frequency/tone spacing) within each symbol of a PRS resource configuration.

Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
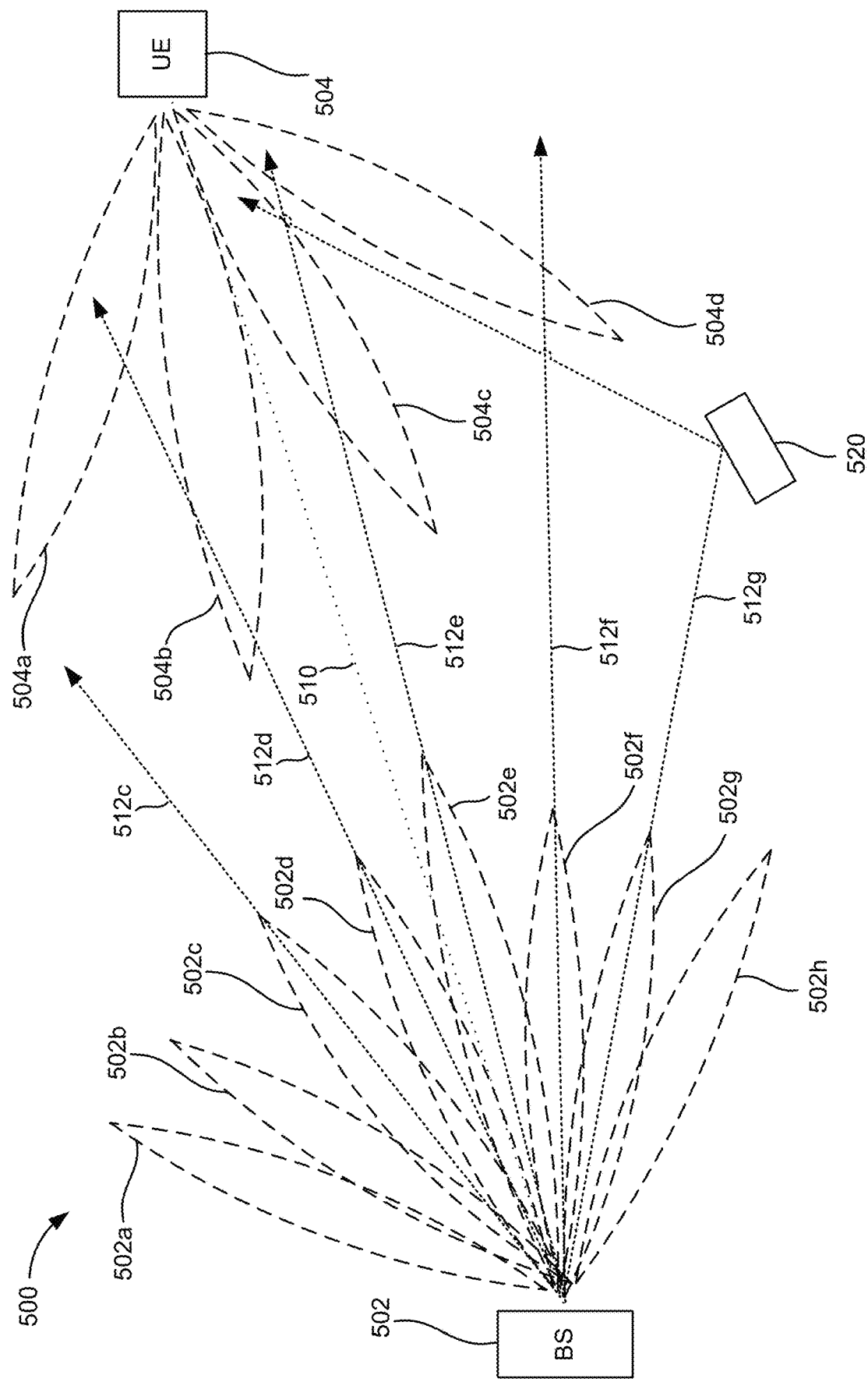
FIG. 5 is a diagram illustrating an example base station in communication with an example UE, according to aspects of the disclosure.

FIG. 5 is a diagram 500 illustrating a base station (BS) 502 (which may correspond to any of the base stations described herein) in communication with a UE 504 (which may correspond to any of the UEs described herein). Referring to FIG. 5, the base station 502 may transmit a beamformed signal to the UE 504 on one or more transmit beams 502a, 502b, 502c, 502d, 502e, 502f, 502g, 502h, each having a beam identifier that can be used by the UE 504 to identify the respective beam. Where the base station 502 is beamforming towards the UE 504 with a single array of antennas (e.g., a single TRP/cell), the base station 502 may perform a "beam sweep" by transmitting first beam 502a, then beam 502b, and so on until lastly transmitting beam 502h. Alternatively, the base station 502 may transmit beams 502a-502h in some pattern, such as beam 502a, then beam 502h, then beam 502b, then beam 502g, and so on. Where the base station 502 is beamforming towards the UE 504 using multiple arrays of antennas (e.g., multiple TRPs/cells), each antenna array may perform a beam sweep of a subset of the beams 502a-502h. Alternatively, each of beams 502a-502h may correspond to a single antenna or antenna array.

FIG. 5 further illustrates the paths 512c, 512d, 512e, 512f, and 512g followed by the beamformed signal transmitted on beams 502c, 502d, 502e, 502f, and 502g, respectively. Each path 512c, 512d, 512e, 512f, 512g may correspond to a single "multipath" or, due to the propagation characteristics of radio frequency (RF) signals through the environment, may be comprised of a plurality (a cluster) of "multipaths." Note that although only the paths for beams 502c-502g are shown, this is for simplicity, and the signal transmitted on each of beams 502a-502h will follow some path. In the example shown, the paths 512c, 512d, 512e, and 512f are straight lines, while path 512g reflects off an obstacle 520 (e.g., a building, vehicle, terrain feature, etc.).

The UE 504 may receive the beamformed signal from the base station 502 on one or more receive beams 504a, 504b, 504c, 504d. Note that for simplicity, the beams illustrated in FIG. 5 represent either transmit beams or receive beams, depending on which of the base station 502 and the UE 504 is transmitting and which is receiving. Thus, the UE 504 may also transmit a beamformed signal to the base station 502 on one or more of the beams 504a-504d, and the base station 502 may receive the beamformed signal from the UE 504 on one or more of the beams 502a-502h.

In an aspect, the base station 502 and the UE 504 may perform beam training to align the transmit and receive beams of the base station 502 and the UE 504. For example, depending on environmental conditions and other factors, the base station 502 and the UE 504 may determine that the best transmit and receive beams are 502d and 504b, respectively, or beams 502e and 504c, respectively. The direction of the best transmit beam for the base station 502 may or may not be the same as the direction of the best receive beam, and likewise, the direction of the best receive beam for the UE 504 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 502 may transmit reference signals (e.g., PRS, CRS, TRS, CSI-RS, PSS, SSS, etc.) to the UE 504 on one or more of beams 502a-502h, with each beam having a different transmit angle. The different transmit angles of the beams will result in different received signal strengths (e.g., RSRP, RSRQ, SINR, etc.) at the UE 504. Specifically, the received signal strength will be lower for transmit beams 502a-502h that are further from the line of sight (LOS) path 510 between the base station 502 and the UE 504 than for transmit beams 502a-502h that are closer to the LOS path 510.

In the example of FIG. 5, if the base station 502 transmits reference signals to the UE 504 on beams 502c, 502d, 502e, 502f, and 502g, then transmit beam 502e is best aligned with the LOS path 510, while transmit beams 502c, 502d, 502f, and 502g are not. As such, beam 502e is likely to have a higher received signal strength at the UE 504 than beams 502c, 502d, 502f, and 502g. Note that the reference signals transmitted on some beams (e.g., beams 502c and/or 502f) may not reach the UE 504, or energy reaching the UE 504 from these beams may be so low that the energy may not be detectable or at least can be ignored.

The UE 504 can report the received signal strength, and optionally, the associated measurement quality, of each measured transmit beam 502c-502g to the base station 502, or alternatively, the identity of the transmit beam having the highest received signal strength (beam 502e in the example of FIG. 5). Alternatively or additionally, if the UE 504 is also engaged in a round-trip-time (RTT) or time-difference of arrival (TDOA) positioning session with at least one base station 502 or a plurality of base stations 502, respectively, the UE 504 can report reception-to-transmission (Rx-Tx) time difference or reference signal time difference (RSTD) measurements (and optionally the associated measurement qualities), respectively, to the serving base station 502 or other positioning entity. In any case, the positioning entity (e.g., the base station 502, a location server, a third-party client, UE 504, etc.) can estimate the angle from the base station 502 to the UE 504 as the AoD of the transmit beam having the highest received signal strength at the UE 504, here, transmit beam 502e.

In one aspect of DL-AoD-based positioning, where there is only one involved base station 502, the base station 502 and the UE 504 can perform a round-trip-time (RTT) procedure to determine the distance between the base station 502 and the UE 504. Thus, the positioning entity can determine both the direction to the UE 504 (using DL-AoD positioning) and the distance to the UE 504 (using RTT positioning) to estimate the location of the UE 504. Note that the AoD of the transmit beam having the highest received signal strength does not necessarily lie along the LOS path 510, as shown in FIG. 5. However, for DL-AoD-based positioning purposes, it is assumed to do so.

In another aspect of DL-AoD-based positioning, where there are multiple involved base stations 502, each involved base station 502 can report, to the serving base station 502, the determined AoD from the respective base station 502 to the UE 504, or the RSRP measurements. The serving base station 502 may then report the AoDs or RSRP measurements from the other involved base station(s) 502 to the positioning entity (e.g., UE 504 for UE-based positioning or a location server for UE-assisted positioning). With this information, and knowledge of the base stations' 502 geographic locations, the positioning entity can estimate a location of the UE 504 as the intersection of the determined AoDs. There should be at least two involved base stations 502 for a two-dimensional (2D) location solution, but as will be appreciated, the more base stations 502 that are involved in the positioning procedure, the more accurate the estimated location of the UE 504 will be.

To perform an UL-AoA positioning procedure, the UE 504 transmits uplink reference signals (e.g., UL-PRS, SRS, DMRS, etc.) to the base station 502 on one or more of uplink transmit beams 504a-504d. The base station 502 receives the uplink reference signals on one or more of uplink receive beams 502a-502h. The base station 502 determines the angle of the best receive beams 502a-502h used to receive the one or more reference signals from the UE 504 as the AoA from the UE 504 to itself. Specifically, each of the receive beams 502a-502h will result in a different received signal strength (e.g., RSRP, RSRQ, SINR, etc.) of the one or more reference signals at the base station 502. Further, the channel impulse response of the one or more reference signals will be smaller for receive beams 502a-502h that are further from the actual LOS path between the base station 502 and the UE 504 than for receive beams 502a-502h that are closer to the LOS path. Likewise, the received signal strength will be lower for receive beams 502a-502h that are further from the LOS path than for receive beams 502a-502h that are closer to the LOS path. As such, the base station 502 identifies the receive beam 502a-502h that results in the highest received signal strength and, optionally, the strongest channel impulse response, and estimates the angle from itself to the UE 504 as the AoA of that receive beam 502a-502h. Note that as with DL-AoD-based positioning, the AoA of the receive beam 502a-502h resulting in the highest received signal strength (and strongest channel impulse response if measured) does not necessarily lie along the LOS path 510. However, for UL-AoA-based positioning purposes in FR2, it may be assumed to do so.

Note that while the UE 504 is illustrated as being capable of beamforming, this is not necessary for DL-AoD and UL-AoA positioning procedures. Rather, the UE 504 may receive and transmit on an omni-directional antenna.

Where the UE 504 is estimating its location (i.e., the UE is the positioning entity), it needs to obtain the geographic location of the base station 502. The UE 504 may obtain the location from, for example, the base station 502 itself or a location server (e.g., location server 230, LMF 270, SLP 272). With the knowledge of the distance to the base station 502 (based on the RTT or timing advance), the angle between the base station 502 and the UE 504 (based on the UL-AoA of the best receive beam 502a-502h), and the known geographic location of the base station 502, the UE 504 can estimate its location.

Alternatively, where a positioning entity, such as the base station 502 or a location server, is estimating the location of the UE 504, the base station 502 reports the AoA of the receive beam 502a-502h resulting in the highest received signal strength (and optionally strongest channel impulse response) of the reference signals received from the UE 504, or all received signal strengths and channel impulse responses for all receive beams 502 (which allows the positioning entity to determine the best receive beam 502a-502h). The base station 502 may additionally report the Rx-Tx time difference to the UE 504. The positioning entity can then estimate the location of the UE 504 based on the UE's 504 distance to the base station 502, the AoA of the identified receive beam 502a-502h, and the known geographic location of the base station 502.

Figure 6:
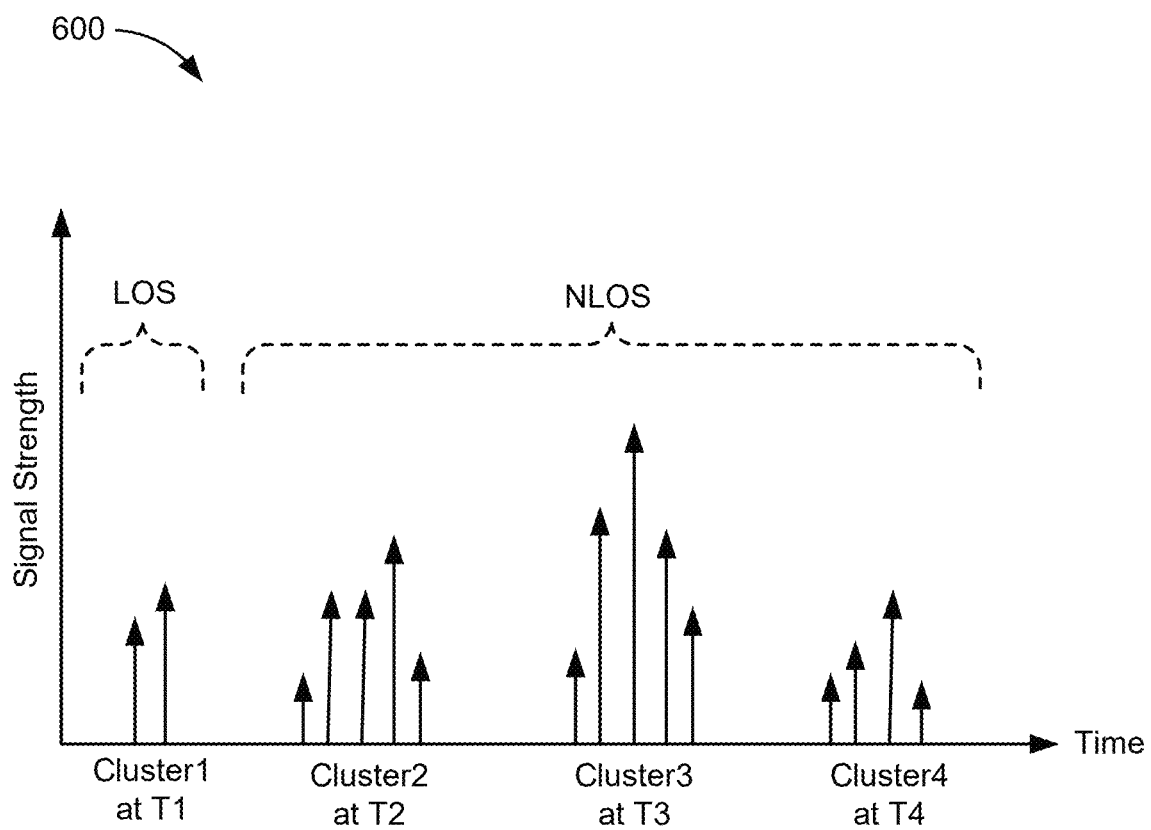
FIG. 6 is a graph representing a radio frequency (RF) channel impulse response over time, according to aspects of the disclosure.

FIG. 6 is a graph 600 representing the channel impulse response of a multipath channel between a receiver device (e.g., any of the UEs or base stations described herein) and a transmitter device (e.g., any other of the UEs or base stations described herein), according to aspects of the disclosure. The channel impulse response represents the intensity of a radio frequency (RF) signal received through a multipath channel as a function of time delay. Thus, the horizontal axis is in units of time (e.g., milliseconds) and the vertical axis is in units of signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 6, the receiver detects/measures multiple (four) clusters of channel taps. Each channel tap represents a multipath that an RF signal followed between the transmitter and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (e.g., potentially following different paths due to reflections), or both.

All of the clusters of channel taps for a given RF signal represent the multipath channel (or simply channel) between the transmitter and receiver. Under the channel illustrated in FIG. 6, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6, because the first cluster of RF signals at time T1 arrives first, it is assumed to correspond to the RF signal transmitted on the transmit beam aligned with the line-of-sight (LOS), or the shortest, path. The third cluster at time T3 is comprised of the strongest RF signals, and may correspond to, for example, the RF signal transmitted on a transmit beam aligned with a non-line-of-sight (NLOS) path. Note that although FIG. 6 illustrates clusters of two to five channel taps, as will be appreciated, the clusters may have more or fewer than the illustrated number of channel taps.

In some cases, the location of a UE may be determined using both uplink-based positioning procedures (e.g., UL-AoA, UL-TDOA, etc.) and downlink-based positioning procedures (e.g., DL-AoD, DL-TDOA, etc.). In such cases, the UE may transmit both an uplink reference signal (for uplink-based positioning) and a report of downlink channel features (e.g., ToA, RSRP, channel impulse response, etc. per measured transmit beam) that the UE estimated from the downlink reference signals received from the base station (for downlink-based positioning). Whether performing a downlink-based positioning procedure, an uplink-based positioning procedure, or both, the base station needs to report channel information to a location server (e.g., location server 230, LMF 270, SLP 272, which may or may not be co-located with the base station) to enable the location server to estimate the UE's location.

More specifically, the base station may estimate the channel profile of the channel (e.g., time and/or angle properties of the channel, referred to herein as the "time-angle channel profile") between itself and the UE along with an associated quality metric and then report this information to the location server. The time-angle channel profile may include the signal strength (e.g., RSRP) of the top N channel taps (i.e., the N channel taps having the highest signal strength) for each of M beams, the time delays (e.g., ToAs) of the top N channel taps for each of the M beams, the angle values for each of the M beams, the SINR of the channel, or any combination thereof. For downlink-based positioning, this information (except for the angle values for each of the M beams) would be reported by the UE for downlink reference signals received at the UE, whereas for uplink-based positioning, this information would be determined by the base station based on uplink reference signals received from the UE. If both downlink-based and uplink-based positioning procedures were performed, the base station would report both the channel information received from the UE and the channel information determined from the uplink reference signals received from the UE.

Based on the channel information received from the base station, the location server could compute the UE's location by deriving positioning metrics such as the ToA, AoA, and/or AoD from the received channel profile. It could also fuse information from multiple base stations (if available) to improve accuracy. Currently, however, the base station is expected to derive this information itself and provide the ToA, AoA, and/or AoD to the location server. However, if the location server has access to the time-angle channel profile, it can exploit interdependencies between time and angle (e.g., in NLOS scenarios) to improve positioning accuracy. In addition, it would be beneficial for the base station to be able to signal the time-angle channel profile to the location server in a compressed manner to reduce signaling overhead.

Accordingly, the present disclosure provides various techniques to enable the base station to compress the time-angle channel profile for transmission to the location server. In a first implementation, the base station may compress the time-angle channel profile in the form of a truncated power-delay profile (TPDP), in either a one-dimensional (1D) or two-dimensional (2D) representation. The base station can then report the channel profile to the location server as the TPDP.

A power-delay profile (PDP) indicates the intensity of an RF signal received through a multipath channel as a function of time delay (e.g., as illustrated in FIG. 6). The time delay is the difference in arrival times between multipaths (e.g., the ToA of each channel tap, or the ToA of each cluster of channel taps, such as T1, T2, T3, etc. in FIG. 6). If represented as a graph, the horizontal axis is in units of time (e.g., ms) and the vertical axis is in units of signal strength (e.g., decibels). A TPDP is a PDP that has been compressed to convey the same information as the PDP but with less signaling overhead.

In the present disclosure, a 1D TPDP may include the signal strength (e.g., RSRP) of the top N channel taps for each of M beams, the time delays of the top N channel taps for each of the M beams, the angle values associated with each of the M beams, the SINR of the multipath channel, or any combination thereof. The M beams may be the measured downlink transmit beams for a downlink-based positioning session or the uplink receive beams for an uplink-based positioning session. Alternatively, there may be one set of M beams for downlink-based positioning and another set of M beams for uplink-based positioning when both are performed. As yet another alternative, there may be one set of M beams for both downlink-based and uplink-based positioning. The angle values associated with each of the M beams would be the transmit angles for downlink transmit beams (for downlink-based positioning) and the receive angles for uplink receive beams (for uplink-based positioning).

In an aspect, the beams (whether transmit or receive) may be uniformly or non-uniformly separated in angle. If they are non-uniformly separated, the angle value report would need to include the absolute angle value of each beam. If they are uniformly separated, however, the angle value report could simply include the angle separation and the number of beams.

In an aspect, a beam-averaged version of the 1D TPDP may be reported. That is, the base station may simply report the average signal strength and time delay for each of the M beams, rather than the signal strength and time delay for the top N channel taps for each of the M beams.

A 2D TPDP may include a table of beam indexes to delay values. For example, each row may represent a quantized beam index (e.g., 0, 1, 2, 3, etc.), or a channel tap for each beam index, and each column may represent a quantized delay value (e.g., 0 ms, 1 ms, 2 ms, 3 ms, etc.). The value of each cell would be the signal strength (e.g., in decibels) of that beam, or channel tap, at that time. Where the base station reports the signal strength per beam, instead of per channel tap, the signal strength may be the average signal strength across all channel taps, or the top N channel taps, for that beam. Where the base station reports the signal strength per channel tap, the table could be truncated to the top N channel taps for each of the reported beams. For example, the base station may report four channel taps for each of three beams, meaning the table would have 12 (i.e., 4*3) rows, with groups of four rows corresponding to the same beam and having the same beam index. The base station could send the table, plus the set of quantized angle values for the beams and the SINR of the channel, as the TPDP report.

The quantization of beams and delays may be uniform or non-uniform. For example, the ToAs of the channel taps could be absolute values or the closest multiple of 1 ms. In the former case, the base station would need to report the absolute values of the ToAs. In the latter case, the quantization information may comprise the number of quantization bins and the bin size. For example, each column heading may be an integer millisecond (e.g., 0 ms, 1 ms, 2 ms, 3 ms, etc.) and a channel tap may be assigned to the integer millisecond value closest to the actual time at which it was detected. The base station would then report the number of columns, the uniform increment between the columns (e.g., 1 ms), and then to which column a particular channel tap belongs.

In another implementation, the time-angle channel profile may be in the form of a neural network whose weights are reported to the location server for machine learning purposes. Machine learning may be used to generate models that may be used to facilitate various aspects associated with the processing of data. Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 7:
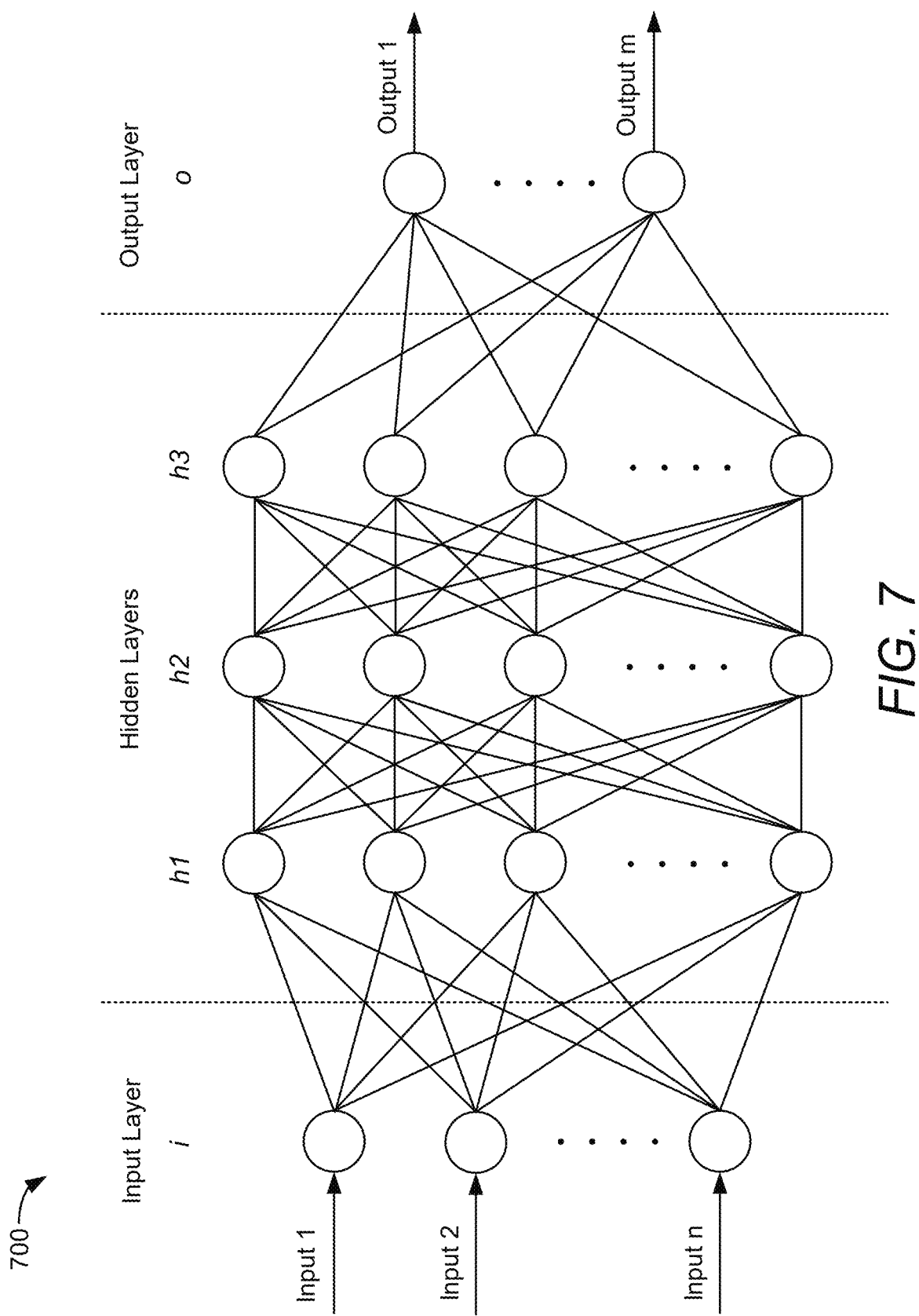
FIG. 7 illustrates an example neural network, according to aspects of the disclosure.

FIG. 7 illustrates an example neural network 700, according to aspects of the disclosure. The neural network 700 includes an input layer i that receives n (one or more) inputs (illustrated as "Input 1," "Input 2," and "Input n"), one or more hidden layers (illustrated as hidden layers "h1," "h2," and "h3") for processing the inputs from the input layer, and an output layer o that provides m (one or more) outputs (labeled "Output 1" and "Output m"). The number of inputs n, hidden layers h, and outputs m may be the same or different. In some designs, the hidden layers h may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system, such as the one or more processors 332, 384, or 394) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

In the present disclosure, the base station can compress the channel profile and transmit the compressed representation along with the weights of the neural network that can be used to decompress the compressed representation. The location server can input the compressed version to the same type of neural network, apply the received weights, and derive/decompress the channel profile.

Figure 8:
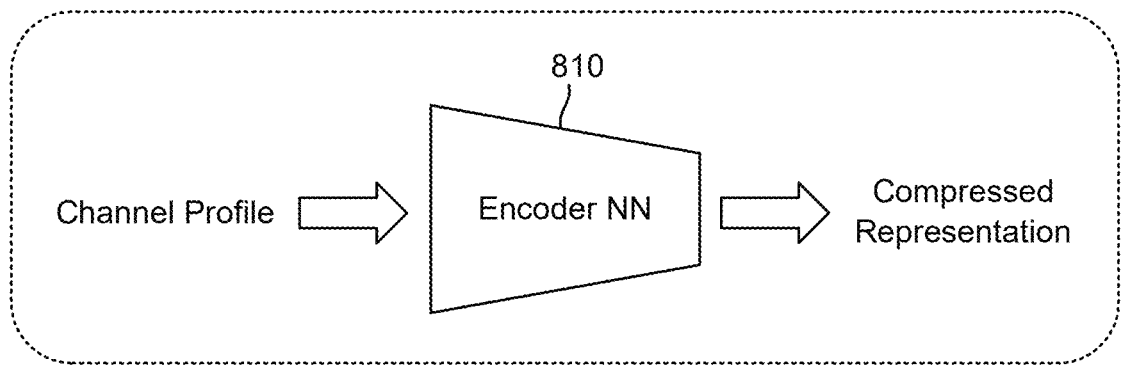
FIG. 8 is a diagram illustrating an example in which an encoder neural network is used to compress a time-angle channel profile and a decoder is used to decompress the time-angle channel profile, according to aspects of the disclosure.
Figure 8:
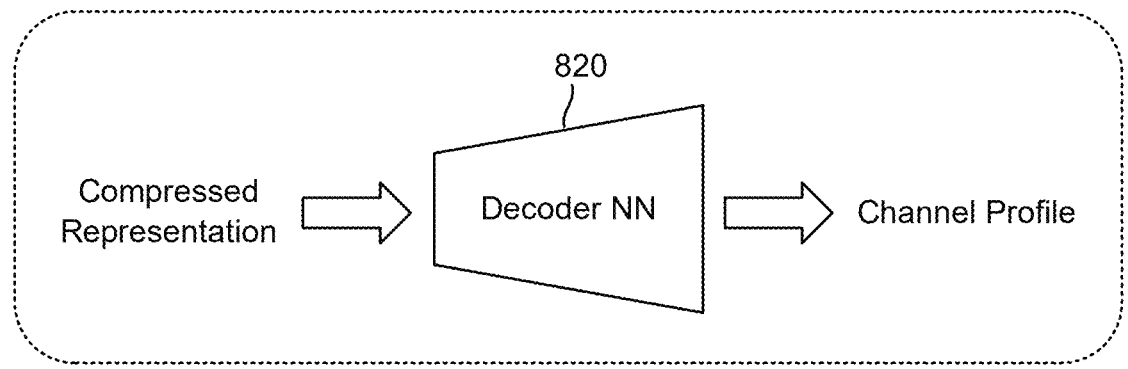

For example, FIG. 8 is a diagram 800 illustrating an example in which an encoder neural network is used to compress a time-angle channel profile and a decoder is used to decompress the time-angle channel profile, according to aspects of the disclosure. At the base station, the time-angle channel profile is input to an encoder neural network 810 (labeled "Encoder NN"). The encoder neural network 810 outputs a compressed representation of the time-angle channel profile, as well as the weights needed to decompress the compressed representation. The base station then transmits the compressed representation of the time-angle channel profile and the weights needed to decompress the compressed representation to the location server.

At the location server, the compressed representation of the time-angle channel profile and the weights needed to decompress the compressed representation are input into a decoder neural network 820 (labeled "Decoder NN"). The decoder neural network 820 applies the weights to the compressed representation and generates the original time-angle channel profile. The location server can then use the time-angle channel profile to determine, for example, the DL-AoD and/or UL-AoA between the UE being positioned and the base station.

In both of the implementations described above (i.e., the TPDP implementation and the neural network implementation), the signal strengths, time delays, and angles may be reported either as absolute values or relative to a reference value. For example, the reference values may be the median signal strength across beams, the median time delay across beams, the estimated ToA, the estimated AoA, the estimated AoD, etc. Each reported value may also be truncated to a certain range, either in terms of absolute value (e.g., no more than three decimal points) or to a range around the reference values (e.g., no more than 10 ms around the estimated ToA).

In an aspect, if the angle values are reported as absolute values, they may be reported in either a local (to the base station) coordinate system or a global coordinate system. The angles could also be either azimuth angles (measured along the horizontal, or x, axis) or elevation angles (measured along the vertical, or z, axis). If both azimuth and elevation angles are reported, the base station may report two sets of TPDP or neural network reports, one for the azimuth angles and one for the elevation angles. In some cases, the base station may also report a three-dimensional (3D) TPDP with {time, azimuth, elevation} axes.

Figure 9:
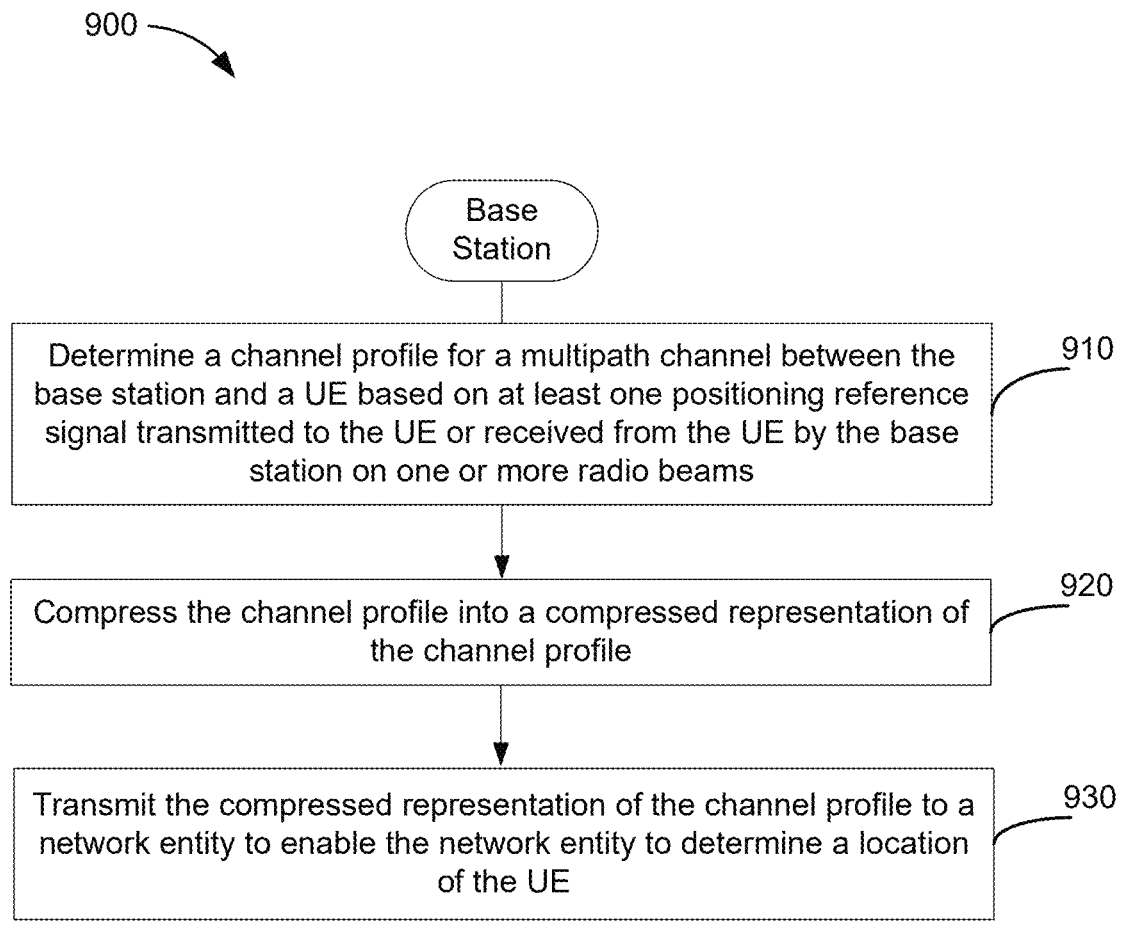
FIGS. 9 to 10 illustrate example methods of wireless positioning, according to aspects of the disclosure.

FIG. 9 illustrates an example method 900 of wireless positioning, according to aspects of the disclosure. In an aspect, the method 900 may be performed by a base station (e.g., any of the base stations described herein).

At 910, the base station determines a channel profile (e.g., time-angle channel profile) for a multipath channel between the base station and a UE (e.g., any of the UEs described herein) based on at least one positioning reference signal transmitted to the UE or received from the UE by the base station on one or more radio beams. For example, where the base station is engaged in an uplink-based positioning procedure with the UE, the at least one positioning reference signal may be an uplink positioning reference signal and the one or more radio beams may be one or more uplink receive beams. Where the base station is engaged in a downlink-based positioning procedure with the UE, the at least one positioning reference signal may be a downlink positioning reference signal and the one or more radio beams may be one or more downlink transmit beams. In an aspect, operation 910 may be performed by the one or more WWAN transceivers 350, the one or more network transceivers 380, the one or more processors 384, memory 386, and/or positioning component 388, any or all of which may be considered means for performing this operation.

At 920, the base station compresses the channel profile into a compressed representation of the channel profile. For example, the compressed representation may be a 1D or 2D TPDP or a neural network representation of the channel profile. In an aspect, operation 920 may be performed by the one or more WWAN transceivers 350, the one or more network transceivers 380, the one or more processors 384, memory 386, and/or positioning component 388, any or all of which may be considered means for performing this operation.

At 930, the base station transmits the compressed representation of the channel profile to a network entity (e.g., location server 230, LMF 270, SLP 272) to enable the network entity to determine a location of the UE. In an aspect, operation 930 may be performed by the one or more WWAN transceivers 350, the one or more network transceivers 380, the one or more processors 384, memory 386, and/or positioning component 388, any or all of which may be considered means for performing this operation.

Figure 10:
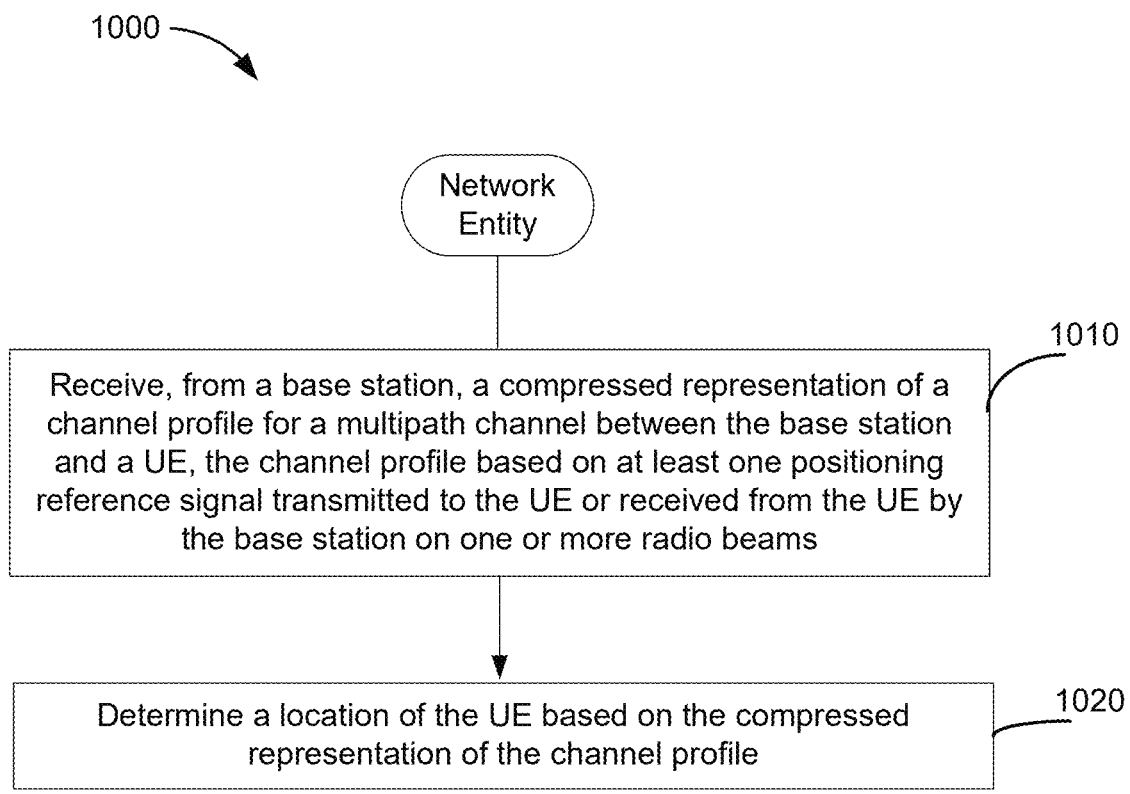

FIG. 10 illustrates an example method 1000 of wireless positioning, according to aspects of the disclosure. In an aspect, the method 1000 may be performed by a network entity (e.g., location server 230, LMF 270, SLP 272).

At 1010, the network entity receives, from a base station (e.g., any of the base stations described herein), a compressed representation of a channel profile (e.g., time-angle channel profile) for a multipath channel between the base station and a UE (e.g., any of the UEs described herein), the channel profile based on at least one positioning reference signal transmitted to the UE or received from the UE by the base station on one or more radio beams. For example, where the base station is engaged in an uplink-based positioning procedure with the UE, the at least one positioning reference signal may be an uplink positioning reference signal and the one or more radio beams may be one or more uplink receive beams. Where the base station is engaged in a downlink-based positioning procedure with the UE, the at least one positioning reference signal may be a downlink positioning reference signal and the one or more radio beams may be one or more downlink transmit beams. In an aspect, the compressed representation may be a 1D or 2D TPDP or a neural network representation of the channel profile. In an aspect, operation 1010 may be performed by the one or more network transceivers 390, the one or more processors 394, memory 396, and/or positioning component 398, any or all of which may be considered means for performing this operation.

At 1020, the network entity determines a location of the UE based on the channel profile. For example, the location server may use uplink-based or downlink-based positioning techniques based on the compressed representation of the channel profile from the base station and possibly additional base stations to determine the location of the UE. In an aspect, operation 1030 may be performed by the one or more network transceivers 390, the one or more processors 394, memory 396, and/or positioning component 398, any or all of which may be considered means for performing this operation.

As will be appreciated, a technical advantage of the methods 900 and 1000 is that, by reporting the time-angle channel profile, the base enables the location server to use both time and angle information to exploit any interdependencies between time and angle to obtain more accurate positioning of a UE. In addition, it allows the location server to fuse channel information from multiple base stations to improve positioning accuracy for a UE.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a base station, comprising: determining a channel profile for a multipath channel between the base station and a user equipment (UE) based on at least one positioning reference signal transmitted to the UE or received from the UE by the base station on one or more radio beams; compressing the channel profile into a compressed representation of the channel profile; and transmitting the compressed representation of the channel profile to a network entity to enable the network entity to determine a location of the UE.

Clause 2. The method of clause 1, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 3. The method of clause 2, wherein, based on angles of the one or more radio beams being non-uniformly spaced, the angle value of each of the one or more radio beams comprises an absolute angle value.

Clause 4. The method of clause 2, wherein, based on angles of the one or more radio beams being uniformly spaced, the compressed representation of the channel profile includes an angle separation between each of the one or more radio beams and a number of the one or more radio beams.

Clause 5. The method of any of clauses 2 to 4, wherein the compressed representation of the channel profile includes absolute values of the signal strengths, the time delays, the angle values, or any combination thereof.

Clause 6. The method of any of clauses 2 to 4, wherein the compressed representation of the channel profile includes values of the signal strengths, the time delays, the angle values, or any combination thereof relative to corresponding reference values.

Clause 7. The method of clause 6, wherein: a reference value for the signal strengths comprises a median signal strength across the one or more radio beams, a reference value for the time delays comprises an estimated time of arrival (ToA) of the multipath channel, a reference value for the angle values comprises an estimated angle of arrival (AoA) of the multipath channel, or any combination thereof.

Clause 8. The method of any of clauses 2 to 7, wherein the compressed representation of the channel profile includes the angle value of each of the one or more radio beams in a local coordinate system.

Clause 9. The method of any of clauses 2 to 7, wherein the compressed representation of the channel profile includes the angle value of each of the one or more radio beams in a global coordinate system.

Clause 10. The method of any of clauses 2 to 9, wherein the compressed representation of the channel profile includes an azimuth angle, an elevation angle, or both for the angle value of each of the one or more radio beams.

Clause 11. The method of any of clauses 1 to 10, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 12. The method of any of clauses 1 to 11, wherein: the one or more radio beams comprise one or more uplink receive beams, the at least one positioning reference signal comprises at least one uplink positioning reference signal, and the determining the channel profile comprises: receiving the at least one uplink positioning reference signal from the UE on the one or more uplink receive beams; and determining the channel profile based on measurement of the at least one uplink positioning reference signal and angles of the one or more uplink receive beams.

Clause 13. The method of any of clauses 1 to 11, wherein: the one or more radio beams comprise one or more downlink transmit beams, the at least one positioning reference signal comprises at least one downlink positioning reference signal, and the determining the channel profile comprises: transmitting the at least one downlink positioning reference signal to the UE on the one or more downlink transmit beams; and receiving, from the UE, a report indicating downlink channel features of the multipath channel based on the at least one downlink positioning reference signal.

Clause 14. The method of clause 13, wherein the downlink channel features comprise at least: signal strengths of one or more channel taps of each of the one or more downlink transmit beams, time delays of the one or more channel taps of each of the one or more downlink transmit beams, an SINR measurement of the multipath channel, or any combination thereof.

Clause 15. The method of any of clauses 13 to 14, wherein the determining the channel profile further comprises: determining an angle value of each of the one or more downlink transmit beams based on the report identifying the one or more downlink transmit beams.

Clause 16. The method of any of clauses 1 to 15, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 17. The method of clause 16, wherein: the 2D table includes only a threshold number of channel taps of each of the one or more radio beams having a highest signal strength, the 2D table includes only a threshold number of radio beams and corresponding angles, or any combination thereof.

Clause 18. The method of any of clauses 16 to 17, wherein beam indexes and time delay values of the 2D table are uniformly quantized.

Clause 19. The method of clause 18, wherein the compressed representation of the channel profile comprises a number and size of quantizations of the beam indexes and the time delay values.

Clause 20. The method of any of clauses 1 to 19, wherein the compressed representation of the channel profile comprises a truncated power-delay profile (TPDP) of the channel profile.

Clause 21. The method of any of clauses 1 to 20, wherein compressing the channel profile comprises: inputting the channel profile to a neural network; and receiving, as output from the neural network, the compressed representation of the channel profile and one or more weights to enable the neural network to decompress the compressed representation of the channel profile, the method further comprising: transmitting the one or more weights to the network entity.

Clause 22. The method of any of clauses 1 to 21, wherein the network entity comprises a location server.

Clause 23. The method of any of clauses 1 to 22, wherein the base station is involved in an uplink-based positioning procedure, a downlink-based positioning procedure, or both with the UE.

Clause 24. A method of wireless positioning performed by a network entity, comprising: receiving, from a base station, a compressed representation of a channel profile for a multipath channel between the base station and a user equipment (UE), the channel profile based on at least one positioning reference signal transmitted to the UE or received from the UE by the base station on one or more radio beams; and determining a location of the UE based on the compressed representation of the channel profile.

Clause 25. The method of clause 24, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 26. The method of clause 25, wherein, based on angles of the one or more radio beams being non-uniformly spaced, the angle value of each of the one or more radio beams comprises an absolute angle value.

Clause 27. The method of clause 25, wherein, based on angles of the one or more radio beams being uniformly spaced, the compressed representation of the channel profile includes an angle separation between each of the one or more radio beams and a number of the one or more radio beams.

Clause 28. The method of any of clauses 25 to 27, wherein the compressed representation of the channel profile includes absolute values of the signal strengths, the time delays, the angle values, or any combination thereof.

Clause 29. The method of any of clauses 25 to 27, wherein the compressed representation of the channel profile includes values of the signal strengths, the time delays, the angle values, or any combination thereof relative to corresponding reference values.

Clause 30. The method of clause 29, wherein: a reference value for the signal strengths comprises a median signal strength across the one or more radio beams, a reference value for the time delays comprises an estimated time of arrival (ToA) of the multipath channel, a reference value for the angle values comprises an estimated angle of arrival (AoA) of the multipath channel, or any combination thereof.

Clause 31. The method of any of clauses 25 to 30, wherein the compressed representation of the channel profile includes the angle value of each of the one or more radio beams in a local coordinate system.

Clause 32. The method of any of clauses 25 to 30, wherein the compressed representation of the channel profile includes the angle value of each of the one or more radio beams in a global coordinate system.

Clause 33. The method of any of clauses 25 to 32, wherein the compressed representation of the channel profile includes an azimuth angle, an elevation angle, or both for the angle value of each of the one or more radio beams.

Clause 34. The method of any of clauses 24 to 33, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 35. The method of any of clauses 24 to 34, wherein: the one or more radio beams comprise one or more uplink receive beams, and the at least one positioning reference signal comprises at least one uplink positioning reference signal.

Clause 36. The method of any of clauses 24 to 34, wherein: the one or more radio beams comprise one or more downlink transmit beams, and the at least one positioning reference signal comprises at least one downlink positioning reference signal.

Clause 37. The method of any of clauses 24 to 36, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 38. The method of clause 37, wherein: the 2D table includes only a threshold number of channel taps of each of the one or more radio beams having a highest signal strength, the 2D table includes only a threshold number of radio beams and corresponding angles, or any combination thereof.

Clause 39. The method of any of clauses 37 to 38, wherein beam indexes and time delay values of the 2D table are uniformly quantized.

Clause 40. The method of clause 39, wherein the compressed representation of the channel profile comprises a number and size of quantizations of the beam indexes and the time delay values.

Clause 41. The method of any of clauses 24 to 40, wherein the compressed representation of the channel profile comprises a truncated power-delay profile (TPDP) of the channel profile.

Clause 42. The method of any of clauses 24 to 41, wherein: receiving the compressed representation of the channel profile further comprises receiving one or more weights to enable a decoder neural network to decompress the compressed representation of the channel profile, the method further comprising: inputting the compressed representation of the channel profile and the one or more weights into the decoder neural network; and receiving, as output from the decoder neural network, the channel profile.

Clause 43. The method of any of clauses 24 to 42, further comprising: configuring the base station to report the compressed representation of the channel profile for the multipath channel between the base station and the UE.

Clause 44. The method of clause 43, wherein the configuring further comprises: configuring the base station with a time range during which the base station is expected to provide the channel profile, configuring the base station with an angle range within which the base station is expected to provide the channel profile, or any combination thereof.

Clause 45. The method of any of clauses 43 to 44, wherein the configuring further comprises: configuring the base station with a format of the channel profile, quantizations of angle and delay bins, reference values for the angle and delay bins, or any combination thereof.

Clause 46. The method of any of clauses 24 to 45, wherein the network entity comprises a location server.

Clause 47. An apparatus comprising a memory, at least one transceiver, and at least one processor communicatively coupled to the memory and the at least one transceiver, the memory, the at least one transceiver, and the at least one processor configured to perform a method according to any of clauses 1 to 46.

Clause 48. An apparatus comprising means for performing a method according to any of clauses 1 to 46.

Clause 49. A non-transitory computer-readable medium storing computer-executable instructions, the computer-executable comprising at least one instruction for causing a computer or processor to perform a method according to any of clauses 1 to 46.

Additional implementation examples are described in the following numbered clauses:

Clause 1. A method of wireless positioning performed by a base station, comprising: determining a channel profile for a multipath channel between the base station and a user equipment (UE) based on at least one positioning reference signal transmitted to the UE or received from the UE by the base station on one or more radio beams; compressing the channel profile into a compressed representation of the channel profile; and transmitting the compressed representation of the channel profile to a network entity to enable the network entity to determine a location of the UE.

Clause 2. The method of clause 1, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 3. The method of clause 2, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 4. The method of any of clauses 2 to 3, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 5. The method of clause 4, wherein: a reference value for the signal strengths comprises a median signal strength across the one or more radio beams, a reference value for the time delays comprises an estimated time of arrival (ToA) of the multipath channel, a reference value for the angle values comprises an estimated angle of arrival (AoA) of the multipath channel, or any combination thereof.

Clause 6. The method of any of clauses 2 to 5, wherein the compressed representation of the channel profile includes: the angle value of each of the one or more radio beams in a local coordinate system, or the angle value of each of the one or more radio beams in a global coordinate system.

Clause 7. The method of any of clauses 1 to 6, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 8. The method of any of clauses 1 to 7, wherein: the one or more radio beams comprise one or more uplink receive beams, the at least one positioning reference signal comprises at least one uplink positioning reference signal, and the determining the channel profile comprises: receiving the at least one uplink positioning reference signal from the UE on the one or more uplink receive beams; and determining the channel profile based on measurement of the at least one uplink positioning reference signal and angles of the one or more uplink receive beams.

Clause 9. The method of any of clauses 1 to 8, wherein: the one or more radio beams comprise one or more downlink transmit beams, the at least one positioning reference signal comprises at least one downlink positioning reference signal, and the determining the channel profile comprises: transmitting the at least one downlink positioning reference signal to the UE on the one or more downlink transmit beams; and receiving, from the UE, a report indicating downlink channel features of the multipath channel based on the at least one downlink positioning reference signal.

Clause 10. The method of any of clauses 1 to 9, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 11. The method of clause 10, wherein: the 2D table includes only a threshold number of channel taps of each of the one or more radio beams having a highest signal strength, the 2D table includes only a threshold number of radio beams and corresponding angles, or any combination thereof.

Clause 12. The method of any of clauses 10 to 11, wherein beam indexes and time delay values of the 2D table are uniformly quantized.

Clause 13. The method of clause 12, wherein the compressed representation of the channel profile comprises a number and size of quantizations of the beam indexes and the time delay values.

Clause 14. The method of any of clauses 1 to 13, wherein the compressed representation of the channel profile comprises a truncated power-delay profile (TPDP) of the channel profile.

Clause 15. The method of any of clauses 1 to 14, wherein compressing the channel profile comprises: inputting the channel profile to a neural network; and receiving, as output from the neural network, the compressed representation of the channel profile and one or more weights to enable the neural network to decompress the compressed representation of the channel profile, and wherein the method further comprises: transmitting the one or more weights to the network entity.

Clause 16. A method of wireless positioning performed by a network entity, comprising: receiving, from a base station, a compressed representation of a channel profile for a multipath channel between the base station and a user equipment (UE), the channel profile based on at least one positioning reference signal transmitted to the UE or received from the UE by the base station on one or more radio beams; and determining a location of the UE based on the compressed representation of the channel profile.

Clause 17. The method of clause 16, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 18. The method of clause 17, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 19. The method of any of clauses 17 to 18, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 20. The method of any of clauses 17 to 19, wherein the compressed representation of the channel profile includes: the angle value of each of the one or more radio beams in a local coordinate system, or the angle value of each of the one or more radio beams in a global coordinate system.

Clause 21. The method of any of clauses 16 to 20, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 22. The method of any of clauses 16 to 21, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 23. The method of clause 22, wherein: the 2D table includes only a threshold number of channel taps of each of the one or more radio beams having a highest signal strength, the 2D table includes only a threshold number of radio beams and corresponding angles, or any combination thereof.

Clause 24. The method of any of clauses 16 to 23, wherein the compressed representation of the channel profile comprises a truncated power-delay profile (TPDP) of the channel profile.

Clause 25. The method of any of clauses 16 to 24, wherein: receiving the compressed representation of the channel profile further comprises receiving one or more weights to enable a decoder neural network to decompress the compressed representation of the channel profile, the method further comprises: inputting the compressed representation of the channel profile and the one or more weights into the decoder neural network; and receiving, as output from the decoder neural network, the channel profile.

Clause 26. The method of any of clauses 16 to 25, further comprising: configuring the base station to report the compressed representation of the channel profile for the multipath channel between the base station and the UE.

Clause 27. The method of clause 26, wherein the configuring further comprises: configuring the base station with a time range during which the base station is expected to provide the channel profile, configuring the base station with an angle range within which the base station is expected to provide the channel profile, or any combination thereof.

Clause 28. The method of any of clauses 26 to 27, wherein the configuring further comprises: configuring the base station with a format of the channel profile, quantizations of angle and delay bins, reference values for the angle and delay bins, or any combination thereof.

Clause 29. A base station, comprising: a memory; at least one transceiver; and at least one processor communicatively coupled to the memory and the at least one transceiver, the at least one processor configured to: determine a channel profile for a multipath channel between the base station and a user equipment (UE) based on at least one positioning reference signal transmitted to the UE or received from the UE by the base station on one or more radio beams; compress the channel profile into a compressed representation of the channel profile; and transmit, via the at least one transceiver, the compressed representation of the channel profile to a network entity to enable the network entity to determine a location of the UE.

Clause 30. The base station of clause 29, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 31. The base station of clause 30, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 32. The base station of any of clauses 30 to 31, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 33. The base station of clause 32, wherein: a reference value for the signal strengths comprises a median signal strength across the one or more radio beams, a reference value for the time delays comprises an estimated time of arrival (ToA) of the multipath channel, a reference value for the angle values comprises an estimated angle of arrival (AoA) of the multipath channel, or any combination thereof.

Clause 34. The base station of any of clauses 30 to 33, wherein the compressed representation of the channel profile includes: the angle value of each of the one or more radio beams in a local coordinate system, or the angle value of each of the one or more radio beams in a global coordinate system.

Clause 35. The base station of clause 29, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 36. The base station of any of clauses 29 to 35, wherein: the one or more radio beams comprise one or more uplink receive beams, the at least one positioning reference signal comprises at least one uplink positioning reference signal, and the at least one processor configured to determine the channel profile comprises the at least one processor configured to: receive, via the at least one transceiver, the at least one uplink positioning reference signal from the UE on the one or more uplink receive beams; and determine the channel profile based on measurement of the at least one uplink positioning reference signal and angles of the one or more uplink receive beams.

Clause 37. The base station of any of clauses 29 to 36, wherein: the one or more radio beams comprise one or more downlink transmit beams, the at least one positioning reference signal comprises at least one downlink positioning reference signal, and the at least one processor configured to determine the channel profile comprises the at least one processor configured to: transmit, via the at least one transceiver, the at least one downlink positioning reference signal to the UE on the one or more downlink transmit beams; and receive, via the at least one transceiver, from the UE, a report indicating downlink channel features of the multipath channel based on the at least one downlink positioning reference signal.

Clause 38. The base station of clause 29, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 39. The base station of clause 38, wherein: the 2D table includes only a threshold number of channel taps of each of the one or more radio beams having a highest signal strength, the 2D table includes only a threshold number of radio beams and corresponding angles, or any combination thereof.

Clause 40. The base station of any of clauses 38 to 39, wherein beam indexes and time delay values of the 2D table are uniformly quantized.

Clause 41. The base station of clause 40, wherein the compressed representation of the channel profile comprises a number and size of quantizations of the beam indexes and the time delay values.

Clause 42. The base station of clause 29, wherein the compressed representation of the channel profile comprises a truncated power-delay profile (TPDP) of the channel profile.

Clause 43. The base station of clause 29, wherein the at least one processor configured to compress the channel profile comprises the at least one processor configured to: input the channel profile to a neural network; and receive, via the at least one transceiver, as output from the neural network, the compressed representation of the channel profile and one or more weights to enable the neural network to decompress the compressed representation of the channel profile, and wherein the at least one processor is further configured to: transmit, via the at least one transceiver, the one or more weights to the network entity.

Clause 44. A network entity, comprising: a memory; at least one transceiver; and at least one processor communicatively coupled to the memory and the at least one transceiver, the at least one processor configured to: receive, via the at least one transceiver, from a base station, a compressed representation of a channel profile for a multipath channel between the base station and a user equipment (UE), the channel profile based on at least one positioning reference signal transmitted to the UE or received from the UE by the base station on one or more radio beams; and determine a location of the UE based on the compressed representation of the channel profile.

Clause 45. The network entity of clause 44, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 46. The network entity of clause 45, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 47. The network entity of any of clauses 45 to 46, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 48. The network entity of any of clauses 45 to 47, wherein the compressed representation of the channel profile includes: the angle value of each of the one or more radio beams in a local coordinate system, or the angle value of each of the one or more radio beams in a global coordinate system.

Clause 49. The network entity of any of clauses 44 to 48, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 50. The network entity of any of clauses 44 to 49, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 51. The network entity of clause 50, wherein: the 2D table includes only a threshold number of channel taps of each of the one or more radio beams having a highest signal strength, the 2D table includes only a threshold number of radio beams and corresponding angles, or any combination thereof.

Clause 52. The network entity of any of clauses 44 to 51, wherein the compressed representation of the channel profile comprises a truncated power-delay profile (TPDP) of the channel profile.

Clause 53. The network entity of any of clauses 44 to 52, wherein: the at least one processor configured to receive, via the at least one transceiver, the compressed representation of the channel profile further comprises the at least one processor configured to receive, via the at least one transceiver, one or more weights to enable a decoder neural network to decompress the compressed representation of the channel profile, the at least one processor is further configured to: input the compressed representation of the channel profile and the one or more weights into the decoder neural network; and receive, via the at least one transceiver, as output from the decoder neural network, the channel profile.

Clause 54. The network entity of any of clauses 44 to 53, wherein the at least one processor is further configured to: configure the base station to report the compressed representation of the channel profile for the multipath channel between the base station and the UE.

Clause 55. The network entity of clause 54, wherein the at least one processor configured to configure further comprises the at least one processor configured to: configure the base station with a time range during which the base station is expected to provide the channel profile, configure the base station with an angle range within which the base station is expected to provide the channel profile, or any combination thereof.

Clause 56. The network entity of any of clauses 54 to 55, wherein the at least one processor configured to configure further comprises the at least one processor configured to: configure the base station with a format of the channel profile, quantizations of angle and delay bins, reference values for the angle and delay bins, or any combination thereof.

Clause 57. A base station, comprising: means for determining a channel profile for a multipath channel between the base station and a user equipment (UE) based on at least one positioning reference signal transmitted to the UE or received from the UE by the base station on one or more radio beams; means for compressing the channel profile into a compressed representation of the channel profile; and means for transmitting the compressed representation of the channel profile to a network entity to enable the network entity to determine a location of the UE.

Clause 58. The base station of clause 57, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 59. The base station of clause 58, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 60. The base station of any of clauses 58 to 59, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 61. The base station of clause 60, wherein: a reference value for the signal strengths comprises a median signal strength across the one or more radio beams, a reference value for the time delays comprises an estimated time of arrival (ToA) of the multipath channel, a reference value for the angle values comprises an estimated angle of arrival (AoA) of the multipath channel, or any combination thereof.

Clause 62. The base station of any of clauses 58 to 61, wherein the compressed representation of the channel profile includes: the angle value of each of the one or more radio beams in a local coordinate system, or the angle value of each of the one or more radio beams in a global coordinate system.

Clause 63. The base station of any of clauses 57 to 62, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 64. The base station of any of clauses 57 to 63, wherein: the one or more radio beams comprise one or more uplink receive beams, the at least one positioning reference signal comprises at least one uplink positioning reference signal, and the means for determining the channel profile comprises: means for receiving the at least one uplink positioning reference signal from the UE on the one or more uplink receive beams; and means for determining the channel profile based on measurement of the at least one uplink positioning reference signal and angles of the one or more uplink receive beams.

Clause 65. The base station of any of clauses 57 to 64, wherein: the one or more radio beams comprise one or more downlink transmit beams, the at least one positioning reference signal comprises at least one downlink positioning reference signal, and the means for determining the channel profile comprises: means for transmitting the at least one downlink positioning reference signal to the UE on the one or more downlink transmit beams; and means for receiving, from the UE, a report indicating downlink channel features of the multipath channel based on the at least one downlink positioning reference signal.

Clause 66. The base station of any of clauses 57 to 65, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 67. The base station of clause 66, wherein: the 2D table includes only a threshold number of channel taps of each of the one or more radio beams having a highest signal strength, the 2D table includes only a threshold number of radio beams and corresponding angles, or any combination thereof.

Clause 68. The base station of any of clauses 66 to 67, wherein beam indexes and time delay values of the 2D table are uniformly quantized.

Clause 69. The base station of clause 68, wherein the compressed representation of the channel profile comprises a number and size of quantizations of the beam indexes and the time delay values.

Clause 70. The base station of any of clauses 57 to 69, wherein the compressed representation of the channel profile comprises a truncated power-delay profile (TPDP) of the channel profile.

Clause 71. The base station of any of clauses 57 to 70, wherein the means for compressing the channel profile comprises: means for inputting the channel profile to a neural network; and means for receiving, as output from the neural network, the compressed representation of the channel profile and one or more weights to enable the neural network to decompress the compressed representation of the channel profile, and wherein the base station further comprises: means for transmitting the one or more weights to the network entity.

Clause 72. A network entity, comprising: means for receiving, from a base station, a compressed representation of a channel profile for a multipath channel between the base station and a user equipment (UE), the channel profile based on at least one positioning reference signal transmitted to the UE or received from the UE by the base station on one or more radio beams; and means for determining a location of the UE based on the compressed representation of the channel profile.

Clause 73. The network entity of clause 72, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 74. The network entity of clause 73, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 75. The network entity of any of clauses 73 to 74, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 76. The network entity of any of clauses 73 to 75, wherein the compressed representation of the channel profile includes: the angle value of each of the one or more radio beams in a local coordinate system, or the angle value of each of the one or more radio beams in a global coordinate system.

Clause 77. The network entity of any of clauses 72 to 76, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 78. The network entity of any of clauses 72 to 77, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 79. The network entity of clause 78, wherein: the 2D table includes only a threshold number of channel taps of each of the one or more radio beams having a highest signal strength, the 2D table includes only a threshold number of radio beams and corresponding angles, or any combination thereof.

Clause 80. The network entity of any of clauses 72 to 79, wherein the compressed representation of the channel profile comprises a truncated power-delay profile (TPDP) of the channel profile.

Clause 81. The network entity of any of clauses 72 to 80, wherein: the means for receiving the compressed representation of the channel profile further comprises means for receiving one or more weights to enable a decoder neural network to decompress the compressed representation of the channel profile, the network entity further comprises: means for inputting the compressed representation of the channel profile and the one or more weights into the decoder neural network; and means for receiving, as output from the decoder neural network, the channel profile.

Clause 82. The network entity of any of clauses 72 to 81, further comprising: means for configuring the base station to report the compressed representation of the channel profile for the multipath channel between the base station and the UE.

Clause 83. The network entity of clause 82, wherein the configuring further comprises: means for configuring the base station with a time range during which the base station is expected to provide the channel profile, means for configuring the base station with an angle range within which the base station is expected to provide the channel profile, or any combination thereof.

Clause 84. The network entity of any of clauses 82 to 83, wherein the means for configuring further comprises: means for configuring the base station with a format of the channel profile, quantizations of angle and delay bins, reference values for the angle and delay bins, or any combination thereof.

Clause 85. A non-transitory computer-readable medium storing computer-executable instructions that, when executed by a base station, cause the base station to: determine a channel profile for a multipath channel between the base station and a user equipment (UE) based on at least one positioning reference signal transmitted to the UE or received from the UE by the base station on one or more radio beams; compress the channel profile into a compressed representation of the channel profile; and transmit the compressed representation of the channel profile to a network entity to enable the network entity to determine a location of the UE.

Clause 86. The non-transitory computer-readable medium of clause 85, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 87. The non-transitory computer-readable medium of clause 86, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 88. The non-transitory computer-readable medium of any of clauses 86 to 87, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 89. The non-transitory computer-readable medium of clause 88, wherein: a reference value for the signal strengths comprises a median signal strength across the one or more radio beams, a reference value for the time delays comprises an estimated time of arrival (ToA) of the multipath channel, a reference value for the angle values comprises an estimated angle of arrival (AoA) of the multipath channel, or any combination thereof.

Clause 90. The non-transitory computer-readable medium of any of clauses 86 to 89, wherein the compressed representation of the channel profile includes: the angle value of each of the one or more radio beams in a local coordinate system, or the angle value of each of the one or more radio beams in a global coordinate system.

Clause 91. The non-transitory computer-readable medium of any of clauses 85 to 90, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 92. The non-transitory computer-readable medium of any of clauses 85 to 91, wherein: the one or more radio beams comprise one or more uplink receive beams, the at least one positioning reference signal comprises at least one uplink positioning reference signal, and the computer-executable instructions that, when executed by the base station, cause the base station to determine the channel profile comprise computer-executable instructions that, when executed by the base station, cause the base station to: receive the at least one uplink positioning reference signal from the UE on the one or more uplink receive beams; and determine the channel profile based on measurement of the at least one uplink positioning reference signal and angles of the one or more uplink receive beams.

Clause 93. The non-transitory computer-readable medium of any of clauses 85 to 92, wherein: the one or more radio beams comprise one or more downlink transmit beams, the at least one positioning reference signal comprises at least one downlink positioning reference signal, and the computer-executable instructions that, when executed by the base station, cause the base station to determine the channel profile comprise computer-executable instructions that, when executed by the base station, cause the base station to: transmit the at least one downlink positioning reference signal to the UE on the one or more downlink transmit beams; and receive, from the UE, a report indicating downlink channel features of the multipath channel based on the at least one downlink positioning reference signal.

Clause 94. The non-transitory computer-readable medium of any of clauses 85 to 93, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 95. The non-transitory computer-readable medium of clause 94, wherein: the 2D table includes only a threshold number of channel taps of each of the one or more radio beams having a highest signal strength, the 2D table includes only a threshold number of radio beams and corresponding angles, or any combination thereof.

Clause 96. The non-transitory computer-readable medium of any of clauses 94 to 95, wherein beam indexes and time delay values of the 2D table are uniformly quantized.

Clause 97. The non-transitory computer-readable medium of clause 96, wherein the compressed representation of the channel profile comprises a number and size of quantizations of the beam indexes and the time delay values.

Clause 98. The non-transitory computer-readable medium of any of clauses 85 to 97, wherein the compressed representation of the channel profile comprises a truncated power-delay profile (TPDP) of the channel profile.

Clause 99. The non-transitory computer-readable medium of any of clauses 85 to 98, wherein the computer-executable instructions that, when executed by the base station, cause the base station to compress the channel profile comprise computer-executable instructions that, when executed by the base station, cause the base station to: input the channel profile to a neural network; and receive, as output from the neural network, the compressed representation of the channel profile and one or more weights to enable the neural network to decompress the compressed representation of the channel profile, and wherein the non-transitory computer-readable medium further comprises computer-executable instructions that, when executed by the base station, cause the base station to: transmit the one or more weights to the network entity.

Clause 100. A non-transitory computer-readable medium storing computer-executable instructions that, when executed by a network entity, cause the network entity to: receive, from a base station, a compressed representation of a channel profile for a multipath channel between the base station and a user equipment (UE), the channel profile based on at least one positioning reference signal transmitted to the UE or received from the UE by the base station on one or more radio beams; and determine a location of the UE based on the compressed representation of the channel profile.

Clause 101. The non-transitory computer-readable medium of clause 100, wherein the compressed representation of the channel profile comprises: signal strengths of one or more channel taps of each of the one or more radio beams having a highest signal strength, time delays of the one or more channel taps of each of the one or more radio beams, a signal to interference-plus-noise ratio (SINR) measurement of the multipath channel, an angle value of each of the one or more radio beams, or any combination thereof.

Clause 102. The non-transitory computer-readable medium of clause 101, wherein: based on angles of the one or more radio beams being non-uniformly spaced, the angle value of each of the one or more radio beams comprises an absolute angle value, or based on the angles of the one or more radio beams being uniformly spaced, the compressed representation of the channel profile includes an angle separation between each of the one or more radio beams and a number of the one or more radio beams.

Clause 103. The non-transitory computer-readable medium of any of clauses 101 to 102, wherein the compressed representation of the channel profile includes: absolute values of the signal strengths, the time delays, angle values of the one or more radio beams, or any combination thereof, or relative values of the signal strengths, the time delays, the angle values of the one or more radio beams, or any combination thereof relative to corresponding reference values.

Clause 104. The non-transitory computer-readable medium of any of clauses 101 to 103, wherein the compressed representation of the channel profile includes: the angle value of each of the one or more radio beams in a local coordinate system, or the angle value of each of the one or more radio beams in a global coordinate system.

Clause 105. The non-transitory computer-readable medium of any of clauses 100 to 104, wherein the compressed representation of the channel profile comprises: an average signal strength of one or more channel taps of each of the one or more radio beams, an average time delay of the one or more channel taps of each of the one or more radio beams, an SINR measurement of the multipath channel, an angle value of each of the one or more radio beams, or any combination thereof.

Clause 106. The non-transitory computer-readable medium of any of clauses 100 to 105, wherein the compressed representation of the channel profile comprises: a two-dimensional (2D) table having rows identified by beam index and columns identified by time delay value, wherein each cell of the 2D table indicates a signal strength of a channel tap of a beam index at a corresponding time delay value, an SINR measurement of the multipath channel, an angle value of each of the one or more radio beams, or any combination thereof.

Clause 107. The non-transitory computer-readable medium of clause 106, wherein: the 2D table includes only a threshold number of channel taps of each of the one or more radio beams having a highest signal strength, the 2D table includes only a threshold number of radio beams and corresponding angles, or any combination thereof.

Clause 108. The non-transitory computer-readable medium of any of clauses 100 to 107, wherein the compressed representation of the channel profile comprises a truncated power-delay profile (TPDP) of the channel profile.

Clause 109. The non-transitory computer-readable medium of any of clauses 100 to 108, wherein: the computer-executable instructions that, when executed by the network entity, cause the network entity to receive the compressed representation of the channel profile further comprise computer-executable instructions that, when executed by the network entity, cause the base station to receive one or more weights to enable a decoder neural network to decompress the compressed representation of the channel profile, the non-transitory computer-readable medium further comprises computer-executable instructions that, when executed by the network entity, cause the base station to: input the compressed representation of the channel profile and the one or more weights into the decoder neural network; and receive, as output from the decoder neural network, the channel profile.

Clause 110. The non-transitory computer-readable medium of any of clauses 100 to 109, further comprising computer-executable instructions that, when executed by the network entity, cause the network entity to: configure the base station to report the compressed representation of the channel profile for the multipath channel between the base station and the UE.

Clause 111. The non-transitory computer-readable medium of clause 110, wherein the computer-executable instructions that, when executed by the network entity, cause the network entity to configure further comprise computer-executable instructions that, when executed by the network entity, cause the network entity to: configure the base station with a time range during which the base station is expected to provide the channel profile, configure the base station with an angle range within which the base station is expected to provide the channel profile, or any combination thereof.

Clause 112. The non-transitory computer-readable medium of any of clauses 110 to 111, wherein the computer-executable instructions that, when executed by the network entity, cause the network entity to configure further comprise computer-executable instructions that, when executed by the network entity, cause the network entity to: configure the base station with a format of the channel profile, quantizations of angle and delay bins, reference values for the angle and delay bins, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a base station, the method comprising:
   determining a channel profile for a multipath channel between the base station and a user equipment (UE) based on at least one positioning reference signal (1) transmitted to the UE by the base station or (2) received from the UE by the base station, wherein the at least one positioning reference signal is transmitted to the UE or received from the UE on one or more radio beams;
   compressing the channel profile into a compressed representation of the channel profile; and
   transmitting the compressed representation of the channel profile to a network entity to enable the network entity to determine a location of the UE.

2. The method of claim 1, wherein the compressed representation of the channel profile comprises:
   signal strengths of one or more channel taps of each of the one or more radio beams having a highest signal strength,
   time delays of the one or more channel taps of each of the one or more radio beams,
   a signal to interference-plus-noise ratio (SINR) measurement of the multipath channel,
   an angle value of each of the one or more radio beams, or any combination thereof.

3. The method of claim 2, wherein:
   based on angles of the one or more radio beams being non-uniformly spaced, the angle value of each of the one or more radio beams comprises an absolute angle value, or
   based on the angles of the one or more radio beams being uniformly spaced, the compressed representation of the channel profile includes an angle separation between each of the one or more radio beams and a number of the one or more radio beams.

4. The method of claim 2, wherein the compressed representation of the channel profile includes:
   absolute values of the signal strengths, the time delays, angle values of the one or more radio beams, or any combination thereof, or
   relative values of the signal strengths, the time delays, the angle values of the one or more radio beams, or any combination thereof relative to corresponding reference values.

5. The method of claim 4, wherein:
   a reference value for the signal strengths comprises a median signal strength across the one or more radio beams,
   a reference value for the time delays comprises an estimated time of arrival (ToA) of the multipath channel, a reference value for the angle values comprises an estimated angle of arrival (AoA) of the multipath channel, or any combination thereof.

6. The method of claim 2, wherein the compressed representation of the channel profile includes:
the angle value of each of the one or more radio beams in a local coordinate system, or
the angle value of each of the one or more radio beams in a global coordinate system.

7. The method of claim 1, wherein the compressed representation of the channel profile comprises:
an average signal strength of one or more channel taps of each of the one or more radio beams,
an average time delay of the one or more channel taps of each of the one or more radio beams,
a signal to interference-plus-noise ratio (SINR) measurement of the multipath channel,
an angle value of each of the one or more radio beams, or
any combination thereof.

8. The method of claim 1, wherein:
the one or more radio beams comprise one or more uplink receive beams,
the at least one positioning reference signal comprises at least one uplink positioning reference signal, and
the determining the channel profile comprises:
receiving the at least one uplink positioning reference signal from the UE on the one or more uplink receive beams; and
determining the channel profile based on measurement of the at least one uplink positioning reference signal and angles of the one or more uplink receive beams.

9. The method of claim 1, wherein:
the one or more radio beams comprise one or more downlink transmit beams,
the at least one positioning reference signal comprises at least one downlink positioning reference signal, and
the determining the channel profile comprises:
transmitting the at least one downlink positioning reference signal to the UE on the one or more downlink transmit beams; and
receiving, from the UE, a report indicating downlink channel features of the multipath channel based on the at least one downlink positioning reference signal.

10. The method of claim 1, wherein the compressed representation of the channel profile comprises:
a two-dimensional (2D) table having rows identified by beam index and columns identified by time delay value, wherein each cell of the 2D table indicates a signal strength of a channel tap of a beam index at a corresponding time delay value,
a signal to interference-plus-noise ratio (SINR) measurement of the multipath an angle value of each of the one or more radio beams, or
any combination thereof.

11. The method of claim 10, wherein:
the 2D table includes only a threshold number of channel taps of each of the one or more radio beams having a highest signal strength,
the 2D table includes only a threshold number of radio beams and corresponding angles, or
any combination thereof.

12. The method of claim 10, wherein beam indexes and time delay values of the 2D table are uniformly quantized.

13. The method of claim 12, wherein the compressed representation of the channel profile comprises a number and size of quantizations of the beam indexes and the time delay values.

14. The method of claim 1, wherein the compressed representation of the channel profile comprises a truncated power-delay profile (TPDP) of the channel profile.

15. The method of claim 1, wherein compressing the channel profile comprises:
inputting the channel profile to a neural network; and
receiving, as output from the neural network, the compressed representation of the channel profile and one or more weights to enable the neural network to decompress the compressed representation of the channel profile, and
wherein the method further comprises:
transmitting the one or more weights to the network entity.

16. A method of wireless positioning performed by a network entity, the method comprising:
receiving, from a base station, a compressed representation of a channel profile for a multipath channel between the base station and a user equipment (UE), the channel profile based on at least one positioning reference signal (1) transmitted to the UE by the base station or (2) received from the UE by the base station, wherein the at least one positioning reference signal is transmitted to the UE or received from the UE on one or more radio beams; and
determining a location of the UE based on the compressed representation of the channel profile.

17. The method of claim 16, wherein the compressed representation of the channel profile comprises:
signal strengths of one or more channel taps of each of the one or more radio beams having a highest signal strength,
time delays of the one or more channel taps of each of the one or more radio beams,
a signal to interference-plus-noise ratio (SINR) measurement of the multipath channel,
an angle value of each of the one or more radio beams, or
any combination thereof.

18. The method of claim 17, wherein:
based on angles of the one or more radio beams being non-uniformly spaced, the angle value of each of the one or more radio beams comprises an absolute angle value, or
based on the angles of the one or more radio beams being uniformly spaced, the compressed representation of the channel profile includes an angle separation between each of the one or more radio beams and a number of the one or more radio beams.

19. The method of claim 17, wherein the compressed representation of the channel profile includes:
absolute values of the signal strengths, the time delays, angle values of the one or more radio beams, or any combination thereof, or
relative values of the signal strengths, the time delays, the angle values of the one or more radio beams, or any combination thereof relative to corresponding reference values.

20. The method of claim 17, wherein the compressed representation of the channel profile includes:
the angle value of each of the one or more radio beams in a local coordinate system, or
the angle value of each of the one or more radio beams in a global coordinate system.

21. The method of claim 16, wherein the compressed representation of the channel profile comprises:
- an average signal strength of one or more channel taps of each of the one or more radio beams,
- an average time delay of the one or more channel taps of each of the one or more radio beams,
- a signal to interference-plus-noise ratio (SINR) measurement of the multipath channel,
- an angle value of each of the one or more radio beams, or any combination thereof.

22. The method of claim 16, wherein the compressed representation of the channel profile comprises:
- a two-dimensional (2D) table having rows identified by beam index and columns identified by time delay value, wherein each cell of the 2D table indicates a signal strength of a channel tap of a beam index at a corresponding time delay value,
- a signal to interference-plus-noise ratio (SINR) measurement of the multipath channel,
- an angle value of each of the one or more radio beams, or any combination thereof.

23. The method of claim 22, wherein:
- the 2D table includes only a threshold number of channel taps of each of the one or more radio beams having a highest signal strength,
- the 2D table includes only a threshold number of radio beams and corresponding angles, or
- any combination thereof.

24. The method of claim 16, wherein the compressed representation of the channel profile comprises a truncated power-delay profile (TPDP) of the channel profile.

25. The method of claim 16, wherein:
- receiving the compressed representation of the channel profile further comprises receiving one or more weights to enable a decoder neural network to decompress the compressed representation of the channel profile,
- the method further comprises:
  - inputting the compressed representation of the channel profile and the one or more weights into the decoder neural network; and
  - receiving, as output from the decoder neural network, the channel profile.

26. The method of claim 16, further comprising:
- configuring the base station to report the compressed representation of the channel profile for the multipath channel between the base station and the UE.

27. The method of claim 26, wherein the configuring further comprises:
- configuring the base station with a time range during which the base station is expected to provide the channel profile,
- configuring the base station with an angle range within which the base station is expected to provide the channel profile, or
- any combination thereof.

28. The method of claim 26, wherein the configuring further comprises:
- configuring the base station with a format of the channel profile, quantizations of angle and delay bins, reference values for the angle and delay bins, or any combination thereof.

29. A base station, comprising:
- one or more memories;
- one or more transceivers; and
- one or more processors communicatively coupled to the one or more memories and the one or more transceivers, the one or more processors, either alone or in combination, configured to:
  - determine a channel profile for a multipath channel between the base station and a user equipment (UE) based on at least one positioning reference signal (1) transmitted to the UE by the base station or (2) received from the UE by the base station, wherein the at least one positioning reference signal is transmitted to the UE or received from the UE on one or more radio beams;
  - compress the channel profile into a compressed representation of the channel profile; and
  - transmit, via the one or more transceivers, the compressed representation of the channel profile to a network entity to enable the network entity to determine a location of the UE.

30. The base station of claim 29, wherein the compressed representation of the channel profile comprises:
- signal strengths of one or more channel taps of each of the one or more radio beams having a highest signal strength,
- time delays of the one or more channel taps of each of the one or more radio beams,
- a signal to interference-plus-noise ratio (SINR) measurement of the multipath channel,
- an angle value of each of the one or more radio beams, or any combination thereof.

31. The base station of claim 29, wherein the compressed representation of the channel profile comprises:
- an average signal strength of one or more channel taps of each of the one or more radio beams,
- an average time delay of the one or more channel taps of each of the one or more radio beams,
- a signal to interference-plus-noise ratio (SINR) measurement of the multipath channel,
- an angle value of each of the one or more radio beams, or any combination thereof.

32. The base station of claim 29, wherein the compressed representation of the channel profile comprises:
- a two-dimensional (2D) table having rows identified by beam index and columns identified by time delay value, wherein each cell of the 2D table indicates a signal strength of a channel tap of a beam index at a corresponding time delay value,
- a signal to interference-plus-noise ratio (SINR) measurement of the multipath channel,
- an angle value of each of the one or more radio beams, or any combination thereof.

33. The base station of claim 29, wherein the compressed representation of the channel profile comprises a truncated power-delay profile (TPDP) of the channel profile.

34. The base station of claim 29, wherein the one or more processors configured to compress the channel profile comprises the one or more processors, either alone or in combination, configured to:
- input the channel profile to a neural network; and
- receive, as output from the neural network, the compressed representation of the channel profile and one or more weights to enable the neural network to decompress the compressed representation of the channel profile, and
- wherein the one or more processors, either alone or in combination, are further configured to:
  - transmit, via the at least one or more transceivers, the one or more weights to the network entity.

35. A network entity, comprising:
one or more memories;
one or more transceivers; and
one or more processors communicatively coupled to the one or more memories and the one or more transceivers, the one or more processors, either alone or in combination, configured to:
receive, via the one or more transceivers, from a base station, a compressed representation of a channel profile for a multipath channel between the base station and a user equipment (UE), the channel profile based on at least one positioning reference signal (1) transmitted to the UE by the base station or (2) received from the UE by the base station, wherein the at least one positioning reference signal is transmitted to the UE or received from the UE on one or more radio beams; and
determine a location of the UE based on the compressed representation of the channel profile.

36. The network entity of claim 35, wherein the compressed representation of the channel profile comprises:
signal strengths of one or more channel taps of each of the one or more radio beams having a highest signal strength,
time delays of the one or more channel taps of each of the one or more radio beams,
a signal to interference-plus-noise ratio (SINR) measurement of the multipath channel,
an angle value of each of the one or more radio beams, or any combination thereof.

37. The network entity of claim 35, wherein the compressed representation of the channel profile comprises:
an average signal strength of one or more channel taps of each of the one or more radio beams,
an average time delay of the one or more channel taps of each of the one or more radio beams,
a signal to interference-plus-noise ratio (SINR) measurement of the multipath channel,
an angle value of each of the one or more radio beams, or any combination thereof.

38. The network entity of claim 35, wherein the compressed representation of the channel profile comprises:
a two-dimensional (2D) table having rows identified by beam index and columns identified by time delay value, wherein each cell of the 2D table indicates a signal strength of a channel tap of a beam index at a corresponding time delay value,
a signal to interference-plus-noise ratio (SINR) measurement of the multipath channel,
an angle value of each of the one or more radio beams, or any combination thereof.

39. The network entity of claim 35, wherein the compressed representation of the channel profile comprises a truncated power-delay profile (TPDP) of the channel profile.

40. The network entity of claim 35, wherein:
the one or more processors configured to receive the compressed representation of the channel profile comprises the one or more processors, either alone or in combination, further configured to receive one or more weights to enable a decoder neural network to decompress the compressed representation of the channel profile, and
the one or more processors, either alone or in combination, are further configured to:
input the compressed representation of the channel profile and the one or more weights into the decoder neural network; and
receive, as output from the decoder neural network, the channel profile.

* * * * *